(12) United States Patent
Sashikuma et al.

(10) Patent No.: US 8,517,138 B2
(45) Date of Patent: Aug. 27, 2013

(54) HYDRAULIC MOTOR UNIT AND HYDRAULIC FOUR-WHEEL-DRIVE WORKING VEHICLE

(75) Inventors: Kenta Sashikuma, Hyogo (JP); Toshifumi Yasuda, Hyogo (JP)

(73) Assignee: Kanzaki Kokyukoki Mfg. Co., Ltd, Amagasaki-shi, Hyogo (JP)

( * ) Notice: Subject to any disclaimer, the term of this patent is extended or adjusted under 35 U.S.C. 154(b) by 247 days.

(21) Appl. No.: 12/948,466

(22) Filed: Nov. 17, 2010

(65) Prior Publication Data
US 2011/0139532 A1  Jun. 16, 2011

Related U.S. Application Data

(60) Provisional application No. 61/285,511, filed on Dec. 10, 2009.

(51) Int. Cl.
*B60K 17/356* (2006.01)

(52) U.S. Cl.
USPC ............................ 180/307; 60/443; 60/487

(58) Field of Classification Search
USPC ................ 180/242, 305–307; 60/446, 443, 60/487; 90/286; 91/286
See application file for complete search history.

(56) References Cited

U.S. PATENT DOCUMENTS

| 3,603,083 | A  | * | 9/1971  | Coursen | 60/446 |
|---|---|---|---|---|---|
| 5,647,208 | A  | * | 7/1997  | Spitzbarth | 60/371 |
| 6,889,793 | B2 |   | 5/2005  | Okada et al. | |
| 7,062,909 | B2 | * | 6/2006  | Ito et al. | 60/487 |
| 7,621,123 | B2 | * | 11/2009 | Jacobs et al. | 60/428 |
| 8,074,451 | B2 | * | 12/2011 | Kuras et al. | 60/487 |
| 2009/0077960 | A1 | * | 3/2009 | Wrona et al. | 60/487 |

* cited by examiner

*Primary Examiner* — Anne Marie M Boehler
(74) *Attorney, Agent, or Firm* — Sterne, Kessler, Goldstein & Fox P.L.L.C.

(57) ABSTRACT

A hydraulic motor unit according to the present invention includes an electric motor having an electric motor main body that is electrically controlled, an electric motor case that accommodates the electric motor main body and an electric motor main body output shaft that is rotated around an axis line thereof by the electric motor main body, the electric motor case being detachably mounted to the motor housing, wherein mounting of the electric motor to the motor housing causes the electric motor main body output shaft to be operatively connected to the first end of the control shaft so that the control shaft is rotated around the axis line in accordance with rotation of the electric motor main body output shaft.

5 Claims, 17 Drawing Sheets

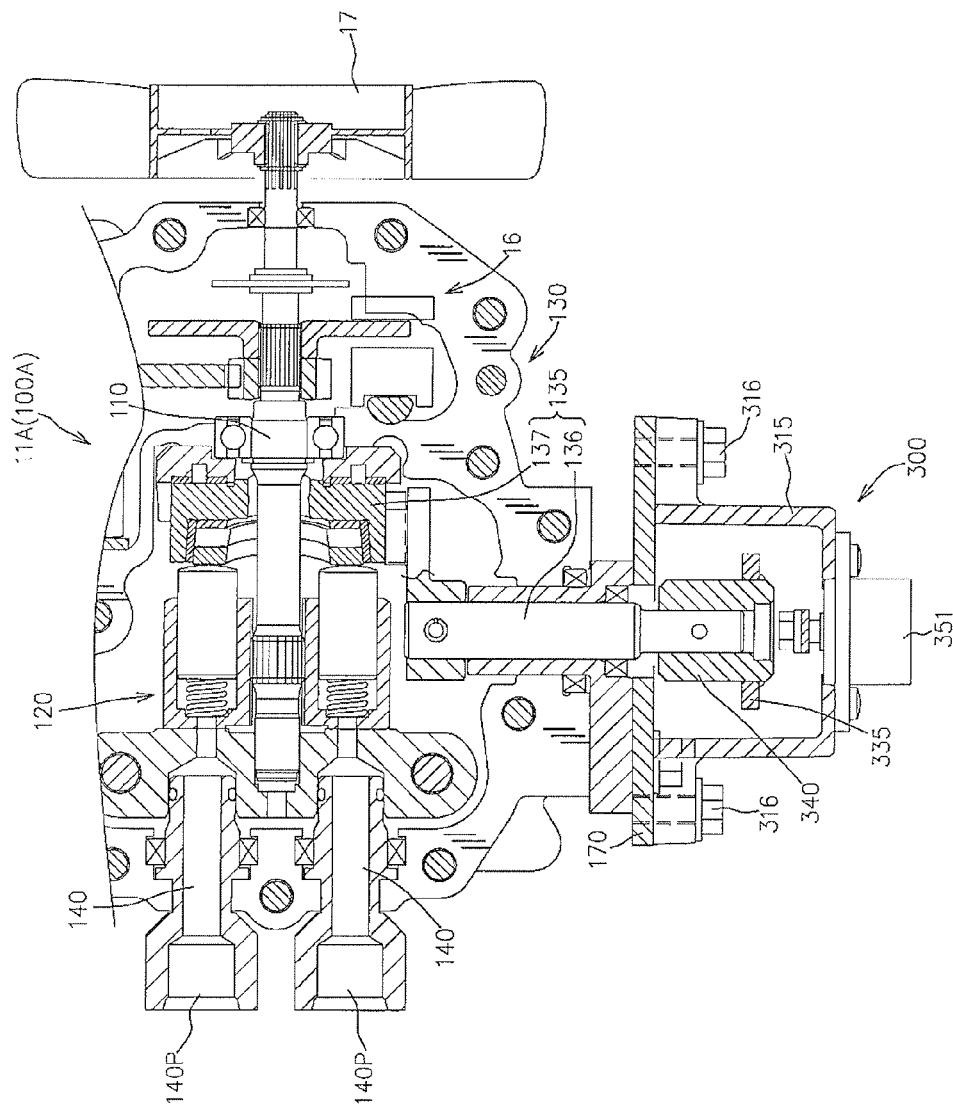

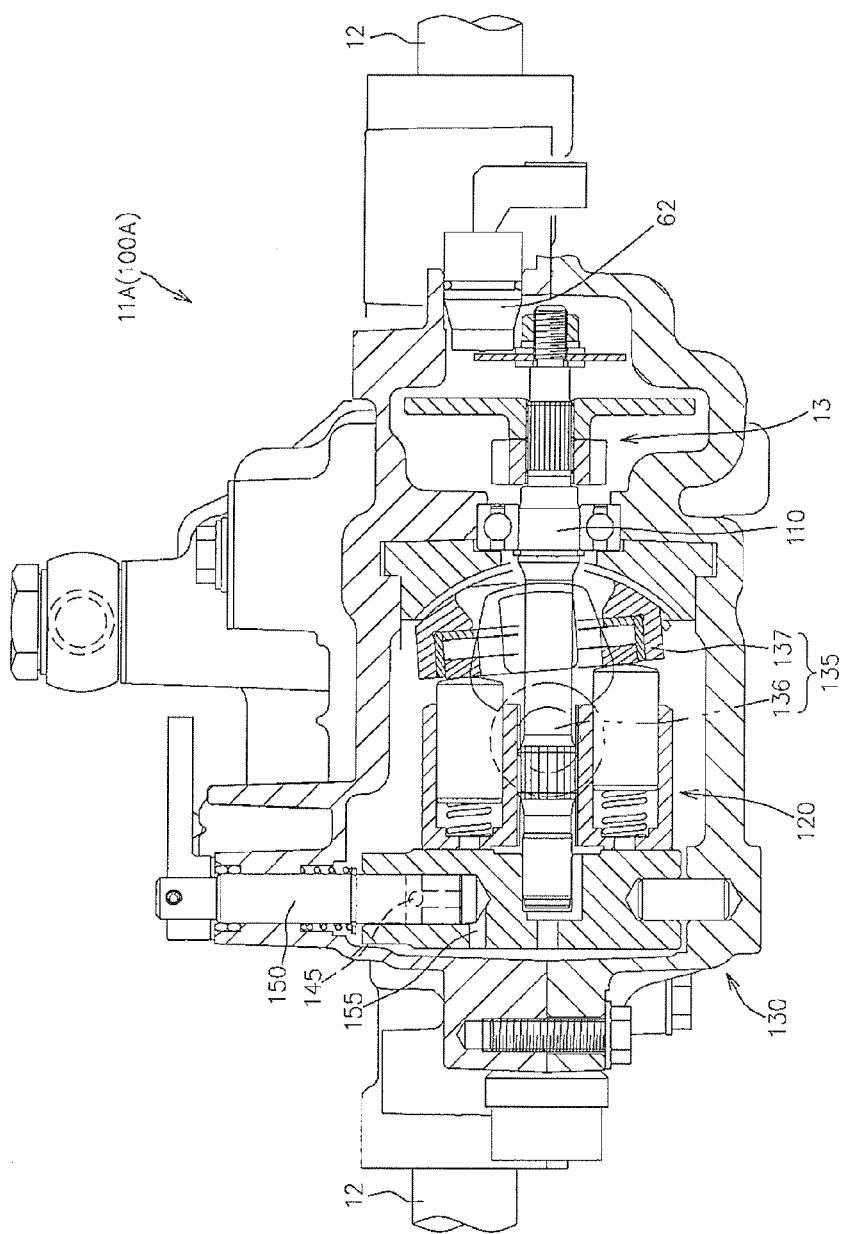

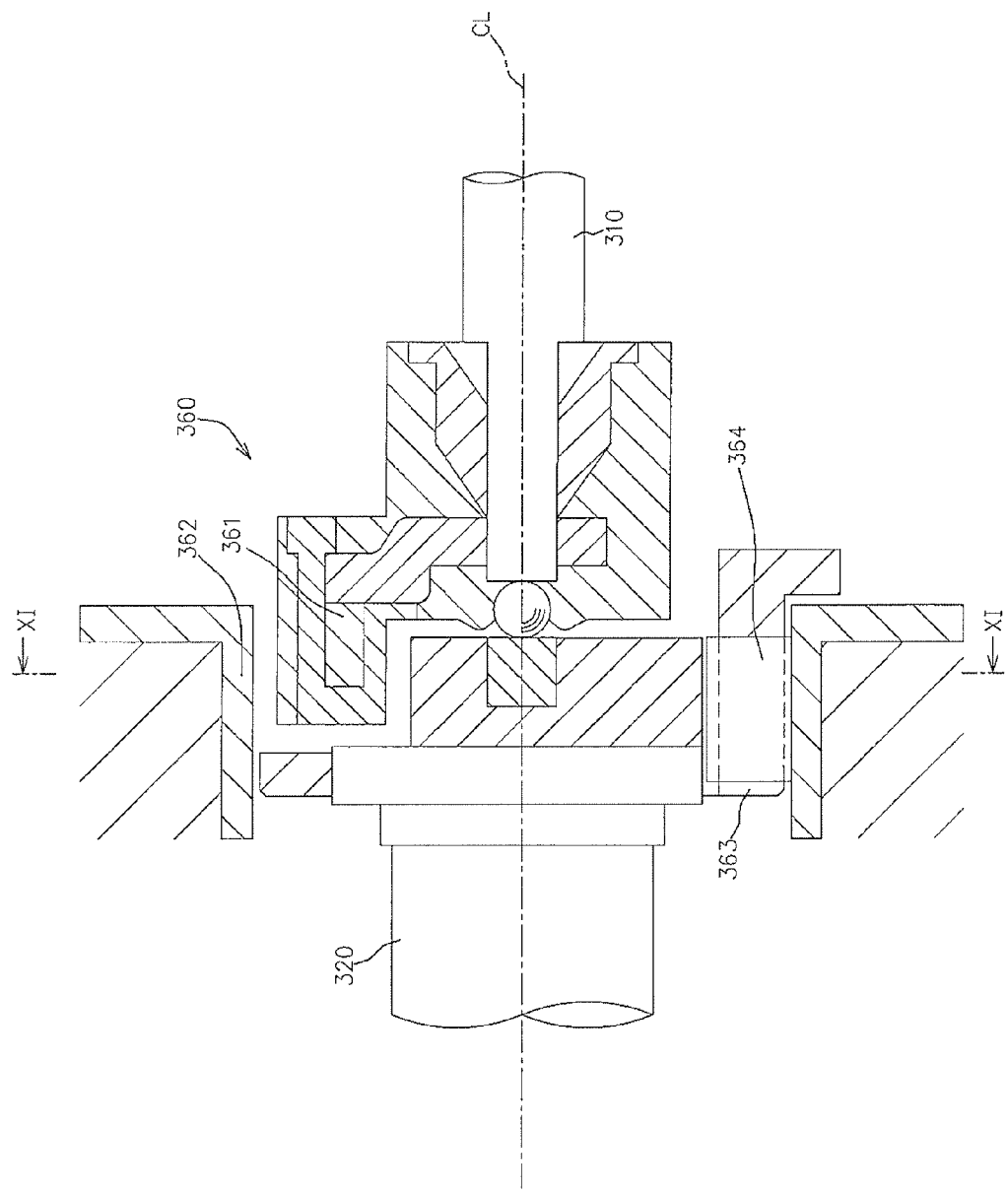

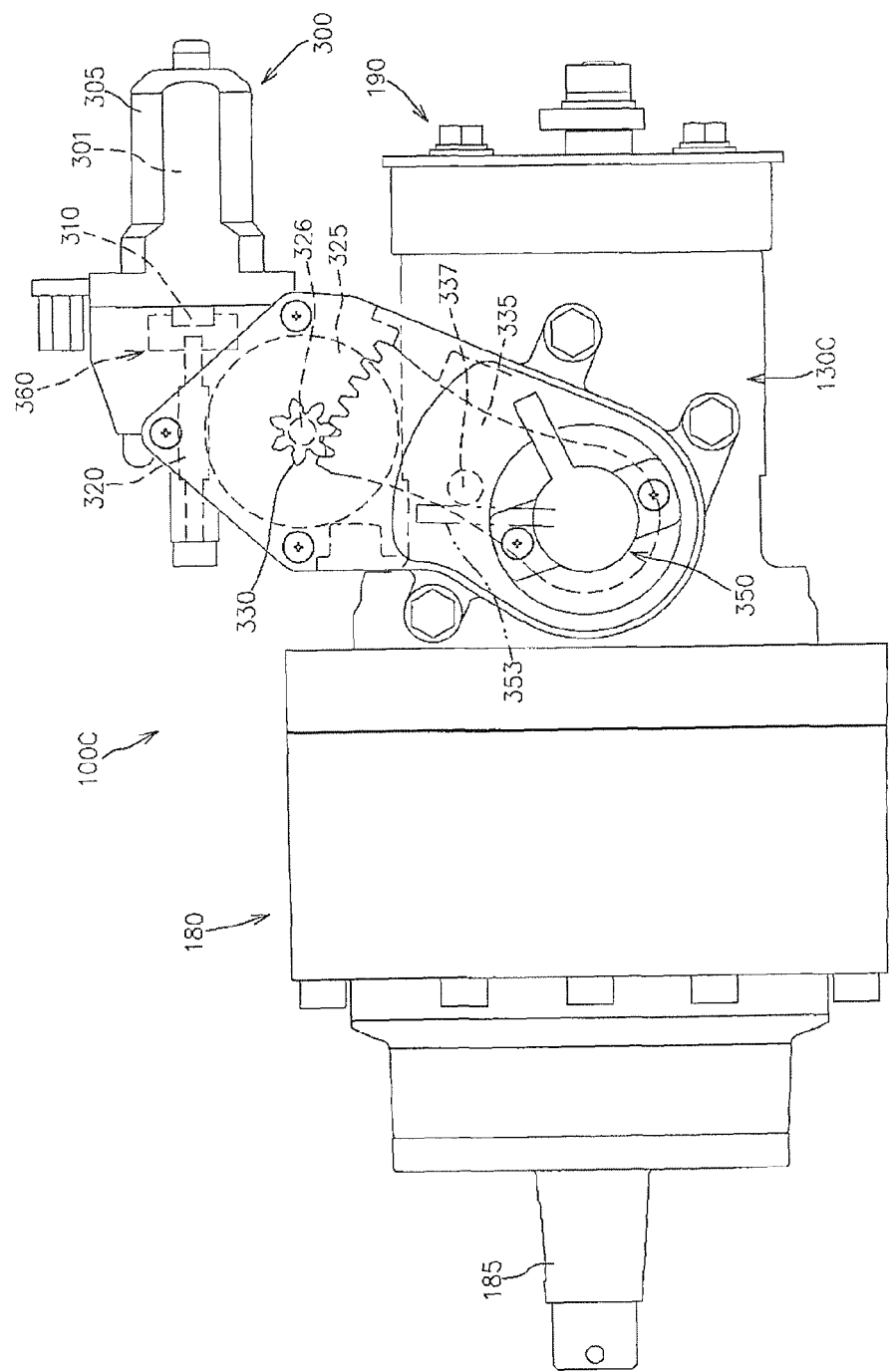

HYDRAULIC MOTOR UNIT AND HYDRAULIC FOUR-WHEEL-DRIVE WORKING VEHICLE

CROSS-REFERENCE TO RELATED APPLICATIONS

This application is a non-provisional application that claims the benefit of U.S. Application No. 61/285,511, filed Dec. 10, 2009, which is incorporated herein by reference in its entirety.

BACKGROUND

1. Field

The present invention relates to a hydraulic motor unit that includes a hydraulic motor and a volume adjusting mechanism for changing a volume of the hydraulic motor.

The present invention also relates to a hydraulic four-wheel-drive working vehicle that includes first and second wheels disposed on one side and the other side in a vehicle longitudinal direction, respectively, in such a manner as that the first wheels have a turning radius smaller than that of the second wheels; a variable-displacement type hydraulic motor unit operatively driving the first wheels; a fixed-displacement type hydraulic motor unit operatively driving the second wheels; and one or plurality of hydraulic pump unit, wherein the variable-displacement type hydraulic motor unit and the fixed-displacement-type hydraulic motor unit are fluidly driven by the hydraulic pump unit in a synchronized manner to each other.

2. Background Art

A variable-displacement-type hydraulic motor unit including a hydraulic motor and a volume adjusting mechanism for changing a volume of the hydraulic motor is used in hydraulic four-wheel-drive working vehicle or the like.

For example, U.S. Pat. No. 6,889,793 (hereinafter, referred to as prior art document 1) discloses an articulate-type working vehicle with a variable-displacement-type hydraulic motor unit functioning as a hydraulic motor unit that operatively drives one of front and rear wheels.

More specifically, in an articulate-type working vehicle that includes front and rear frames disposed on front and rear sides, respectively, and connected to each other in a state that they could swing to each other around a pivot shaft along a substantially vertical direction; front and rear wheels supported by the front and rear frames, respectively; a front hydraulic motor unit operatively driving the front wheels; a rear hydraulic motor unit operatively driving the rear wheels; a hydraulic pump unit fluidly connected in series to the front and rear hydraulic motor units; wherein a length in a vehicle lengthwise direction between the rear wheels and the pivot shaft is shorter than that between the front wheels and the pivot shaft, there is caused a difference in turning radius between the front wheels and the rear wheels in accordance with a turning angle of the vehicle.

In order to compensate for the difference in turning radius, the articulate-type working vehicle includes the variable-displacement-type hydraulic motor unit as one of the front and rear hydraulic motor units.

The variable-displacement-type hydraulic motor unit includes a hydraulic motor and a volume adjusting mechanism that changes a volume of the hydraulic motor. The working vehicle is configured so as to increase or reduce the volume of the hydraulic motor by operating the volume adjusting mechanism in accordance with the turning angle of the vehicle, thereby increasing or reducing driving speed of the corresponding wheels out of the front and rear wheels in accordance with the difference in turning radius between the front wheels and the rear wheels.

However, the variable-displacement-type hydraulic motor unit disclosed by the prior art document 1 is configured so that the volume adjusting mechanism is mechanically operated. As a result, there is needed a structure for transmitting to the volume adjusting mechanism a mechanical movement in accordance with turning motion of the vehicle.

BRIEF SUMMARY

The present invention is made in view of the prior art, and it is an object to provide a variable-displacement-type hydraulic motor unit that includes a hydraulic motor and a volume adjusting mechanism for changing a volume of the hydraulic motor, wherein change of the volume of the hydraulic motor through the volume adjusting mechanism could be easily performed.

In order to achieve the object, the present invention provides a hydraulic motor unit including a hydraulic motor, a motor shaft that supports the hydraulic motor in a relatively non-rotatable manner with respect thereto, a motor housing that accommodates the hydraulic motor and supports the motor shaft in a rotatable manner around an axis line thereof, and a volume adjusting mechanism that changes a volume of the hydraulic motor, wherein the volume adjusting mechanism includes a control shaft that is supported directly or indirectly by the motor housing in a rotatable manner around an axis line thereof in a state where a first end thereof is extended outward from the motor housing, and changes the volume of the hydraulic motor in accordance with rotation of the control shaft around the axis line, the hydraulic motor unit further including an electric motor having an electric motor main body that is electrically controlled, an electric motor case that accommodates the electric motor main body and an electric motor main body output shaft that is rotated around an axis line thereof by the electric motor main body, the electric motor case being detachably mounted to the motor housing, wherein mounting of the electric motor to the motor housing causes the electric motor main body output shaft to be operatively connected to the first end of the control shaft so that the control shaft is rotated around the axis line in accordance with rotation of the electric motor main body output shaft.

In the hydraulic motor unit according to the present invention, the electric motor is detachably connected to the motor housing, and mounting of the electric motor to the motor housing causes the electric motor main body output shaft of the electric motor to be operatively connected to the control shaft of the volume adjusting mechanism so that the control shaft is rotated around the axis line in accordance with the rotation of the electric motor main body output shaft. Accordingly, it is possible to realize the actuation of the volume adjusting mechanism in accordance with the manual operation on an operating member such as a steering operation member that is manually operated for actuating the volume adjusting mechanism by electrically controlling the electric motor based on manual operation amount on the operating member, without mechanically and operatively connecting the operating member and the volume adjusting mechanism. Therefore, it is possible to realize the change of the volume of the hydraulic motor in accordance with the manual operation on the operating member without providing a complicated mechanical link structure.

Preferably, the hydraulic motor unit according to the present invention may further include an operation shaft that is connected to the first end of the control shaft in a relatively non-rotatable manner with respect thereto, a sector gear that has a proximal end connected to the operation shaft and a distal end provided with a gear and extends in a direction perpendicular to the control shaft, and an electric motor cover to which the electric motor case is connected and which is detachably connected to the motor housing, wherein the electric motor includes an electric motor output gear operatively connected to the electric motor main body output shaft.

The electric motor output gear is directly or indirectly supported by the electric motor case so that the electric motor output gear is engaged with the sector gear upon connection of the electric motor cover to the motor housing.

More preferably, the hydraulic motor unit may further includes first and second adjusting screws that have distal ends brought into contact with the sector gear to define first and second ends of a swing range of the sector gear around the operation shaft, the first and second ends being positioned on one and the other side around the operation shaft, wherein fixed positions of the first and second adjusting screws can be changed along respective axis lines.

In a preferable configuration, the sector gear is formed with a pass-through hole penetrating along the axis line of the operation shaft, the motor housing or a fixed member connected to the motor housing is formed with a fixing hole at a position that faces the pass-through hole at the time when the sector gear is positioned at a predetermined position around the operation shaft.

In one embodiment, the hydraulic motor unit may further include a sensor unit mounted to the electric motor cover.

The sensor unit may include a sensor housing mounted to the electric motor cover, a sensor shaft supported by the sensor housing in a rotatable manner around its axis line so as to be coaxial with the operation shaft in a state that the electric motor cover is connected to the motor housing, a sensor arm extending in a direction orthogonal to the operation shaft in a state of having a proximal end portion connected to the sensor shaft, a biasing member biasing toward one side around the sensor shaft a detected body that is formed by the sensor shaft and the sensor arm, and a sensor main body detecting rotational amount of the detected body around the axis line of the sensor shaft.

The sector gear is provided with an engagement pin that extends parallel to the operation shaft and with which the sensor arm biased toward one side around the sensor shaft by the biasing member is engaged in a state where the electric motor cover with the sensor unit is connected to the first motor housing.

Preferably, the electric motor may be provided with a worm shaft that is positioned coaxially with the electric motor main body output shaft and is operatively connected to the electric motor output gear in such a manner as that the electric motor output gear is rotated in accordance with rotation of the worm shaft around its axis line, and a clutch mechanism that is provided between the electric motor main body output shaft and the worm shaft.

The clutch mechanism may include a driving-side arm that is provided at an distal end of the electric motor main body output shaft so as to extend radially outward, a collar member that surrounds the driving-side arm, a driven-side arm that is provided at the end of the worm shaft closer to the electric motor main body output shaft so as to extend radially outward, and a contact member that is disposed between the driven-side aim and the collar member with respect to a radial direction with the axis line of the electric motor main body output shaft and the worm shaft being as a reference.

The driving-side arm has side surfaces facing in a circumferential direction with the axis line of the electric motor main body output shaft being as a reference. The side surfaces are configured so as to press, in the circumferential direction, side surfaces of both the driven-side arm and the contact member that face in the circumferential direction. The driven-side arm has an outer end surface that faces radially outward. The outer end surface is substantially perpendicular to a virtual line connecting a circumferential center of the outer end surface and the axis line of the electric motor main body output shaft and the worm shaft when seen along the axis line.

The prior art document 1 disclose an articulate-type hydraulic four-wheel-drive working vehicle that includes front and rear frames that are connected to each other in a swinging manner around a pivot shaft, and front and rear wheels supported by the front and rear frames, respectively, wherein the front and rear wheels are positioned so that there is occurred a difference in turning radius between the front and rear wheels, wherein a hydraulic pump unit, a variable-displacement-type hydraulic motor unit operatively driving the front wheel and a fixed-displacement-type hydraulic motor unit operatively driving the rear wheel are connected in series to one another, and wherein a volume adjusting mechanism of the variable-displacement-type hydraulic motor unit is operatively connected to the rear frame through a mechanical link mechanism so that a volume of the variable-displacement-type hydraulic motor unit is changed in accordance with a turning angle.

The hydraulic four-wheel-drive working vehicle disclosed in the prior art document 1 can increase traveling speed as much as possible since all of operational fluid discharged from the hydraulic pump unit is supplied to both the variable-displacement-type hydraulic motor unit and the fixed-displacement-type hydraulic motor unit. Further, the working vehicle can effectively prevent slippages and drags of the front and/or rear wheels at turning of the vehicle since the volume adjusting mechanism is actuated in accordance with the turning angle through the mechanical link mechanism.

However, in the working vehicle configured so that the volume adjusting mechanism of the variable-displacement-type motor unit is actuated through the mechanical link mechanism, the volume of the variable-displacement-type hydraulic motor unit is unambiguously defined by the turning angle of the vehicle.

Therefore, it involves a disadvantage that high torque driving state cannot be selected even in a case where it is needed to increase traveling drive torque such as upward travel on slope.

The present application also provides a hydraulic four-wheel-drive working vehicle capable of dissolving the drawback of the prior art.

More specifically, the present application provides a hydraulic four-wheel-drive working vehicle including a vehicle frame, first and second wheels that are supported by the vehicle frame at one side and the other side in a vehicle longitudinal direction and are positioned so that a turning radius of the first wheel becomes smaller than a turning radius of the second wheel as a turning angle of the vehicle becomes larger, a driving power source supported by the vehicle frame, a variable-displacement type hydraulic pump unit operatively driven by the driving power source, a variable-displacement-type first hydraulic motor unit operatively driving the first wheel, a fixed-displacement-type second hydraulic motor unit operatively driving the second wheel, a turning-operation-side sensor that detects the steering angle, and a control device, the first and second hydraulic motor units being hydraulically driven by the hydraulic pump unit in a synchronized manner to each other, wherein the first hydraulic motor unit includes a first hydraulic motor, a first motor shaft supporting the first hydraulic motor in a relatively non-rotatable manner with respect thereto, a first motor housing that accommodates the first hydraulic motor and supports the first motor shaft in a rotatable manner around an axis line thereof, and a motor-side volume adjusting mechanism that changes a volume of the first hydraulic motor, and an electric motor, wherein the motor-side volume adjusting mechanism includes a motor-side control shaft supported directly or indirectly by the first motor housing in a rotatable manner around an axis line thereof in a state that a first end of the motor-side control shaft is extended outward from the first motor housing, and is configured so as to change the volume of the first hydraulic motor in accordance with rotation of the motor-side control shaft around the axis line, wherein the motor-side volume adjusting mechanism is configured so as to change the volume of the first hydraulic motor within a range including a standard volume and a first volume that is larger than the standard volume, the standard volume being set to cause peripheral speed of the first wheel operatively driven by the first hydraulic motor to be equal to peripheral speed of the second wheel operatively driven by the second hydraulic motor, wherein the electric motor includes an electric motor main body that is electrically controlled, an electric motor case that accommodates the electric motor main body and an electric motor main body output shaft that is rotated around an axis line thereof by the electric motor main body, mounting of the electric motor to the first motor housing causes the electric motor main body output shaft to be operatively connected to the first end of the motor-side control shaft so that the motor-side control shaft is rotated around the axis line in accordance with rotation of the electric motor main body output shaft, and wherein the control device includes a normal mode and a torque-up mode, the normal mode controlling the electric motor main body based on signal from the turning-operation-side sensor in such a manner as that the volume of the first hydraulic motor is changed from the standard volume to the first volume as the working vehicle is shifted from straight traveling state to maximum turning state, the torque-up mode keeping the volume of the first hydraulic motor at the first volume regardless of the turning angle of the working vehicle.

Preferably, the hydraulic four-wheel-drive working vehicle according to the present invention may further includes a traveling-speed sensor that detects a traveling speed of the vehicle.

In this case, the control device activates the torque-up mode at the time when the vehicle starts to travel in a state where a torque-up switch capable of being manually operated is manipulated for selecting the torque-up mode, and shifts the torque-up mode to the normal mode upon attainment of traveling speed to a predetermined speed and/or manipulation of the torque-up switch for canceling the torque-up mode.

In one embodiment, the vehicle frame includes first and second frames that are connected to each other in a swinging manner around a pivot shaft along a vertical direction.

The second wheel is supported by the second frame, and the first wheel is supported by the first frame so that a distance between the first wheel and the pivot shaft in the vehicle longitudinal direction is longer than a distance between the second wheel and the pivot shaft in the vehicle longitudinal direction.

BRIEF DESCRIPTION OF THE DRAWINGS

The above, and other objects, features and advantages of the present invention will become apparent from the detailed description thereof in conjunction with the accompanying drawings wherein.

FIGS. 1A and 1B show a straight traveling state and a turning state, respectively.

FIG. 3B is a horizontally cross-sectional partial plan view of a hydraulic motor unit according to a modification of the first embodiment.

FIG. 4 is a cross-sectional view taken along line IV-IV in FIG. 3A.

FIG. 10 is a cross-sectional view taken along line X-X in FIG. 6.

FIG. 16 is an end view viewed from line XVI-XVI in FIG. 15.

DETAILED DESCRIPTION

First Embodiment

Hereinafter, one embodiment of a hydraulic motor unit according to the present invention will be described, with reference to the attached drawings.

Figure 1:
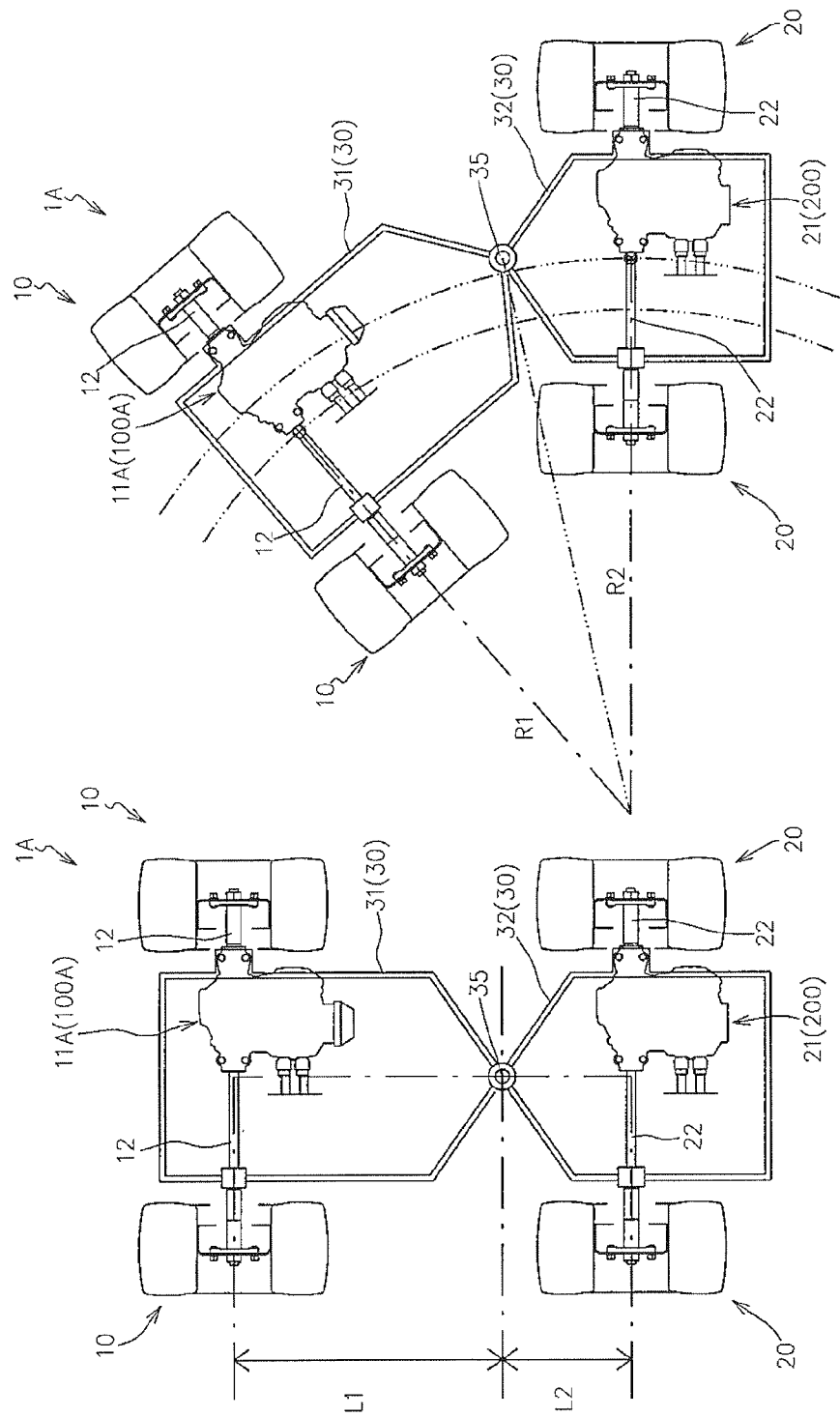
FIGS. 1A and 1B are plan views of a hydraulic four-wheel-drive working vehicle to which a hydraulic motor unit according to a first embodiment of the present invention is applied.

FIGS. 1A and 1B are plan views of a hydraulic four-wheel-drive working vehicle to which a hydraulic motor unit 100A according to the present embodiment is applied. FIGS. 1A and 1B show the working vehicle 1A in a straight traveling state and a turning state, respectively.

Figure 2:
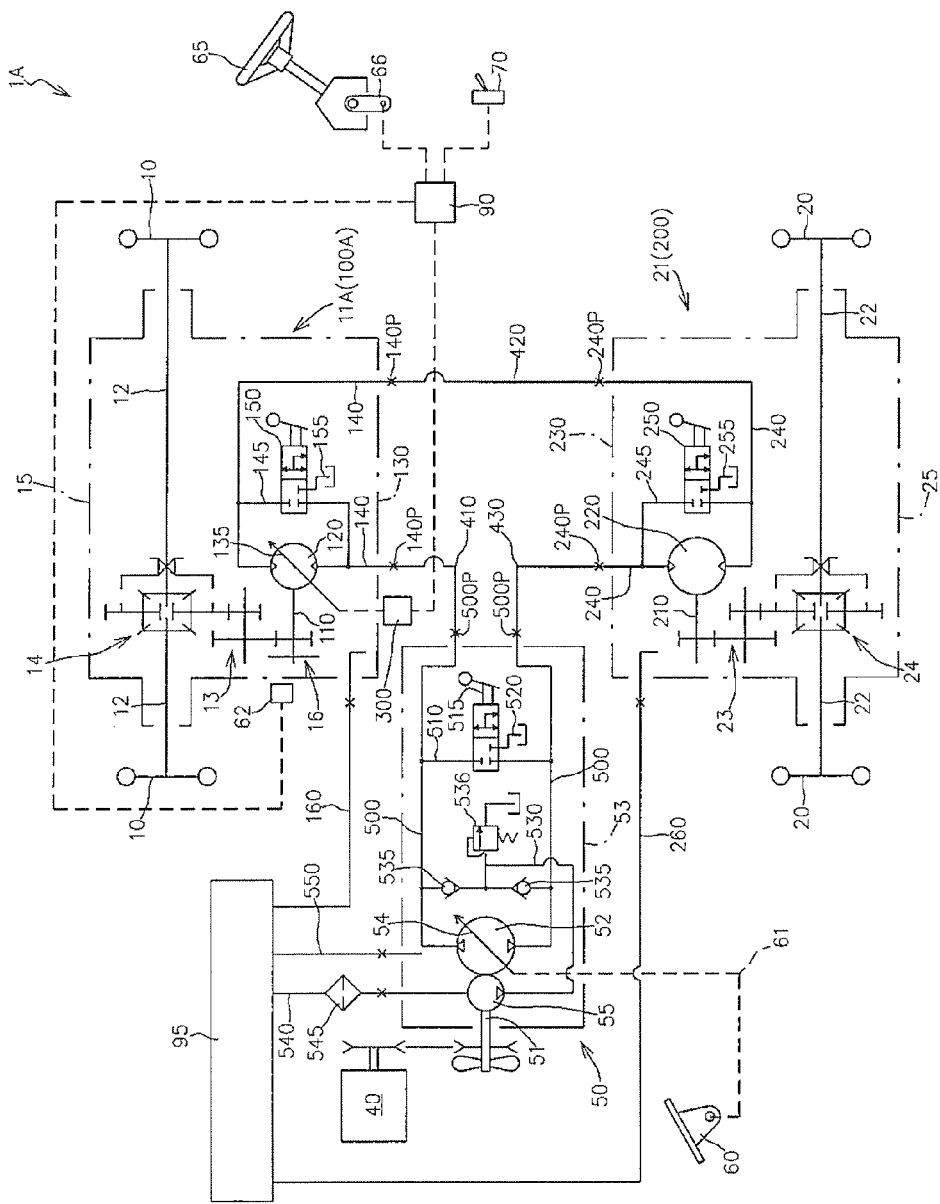
FIG. 2 is a hydraulic circuit diagram of the working vehicle shown in FIGS. 1A and 1B.

FIG. 2 is a hydraulic circuit diagram of the working vehicle 1A.

As shown in FIGS. 1A, 1B and 2, the hydraulic motor unit 100A according to the present embodiment operatively drives one of first wheels 10 and second wheels 20 of the working vehicle 1A that are disposed on one side and the other side in a vehicle longitudinal direction.

Firstly, there will be explained a brief description of the working vehicle 1A.

As illustrated in FIGS. 1A, 1B and 2, the working vehicle 1A includes a vehicle frame 30, a pair of first wheels 10 (front wheels in the present embodiment) and a pair of second wheels 20 (rear wheels in the present embodiment) that are supported by the vehicle frame 30 at one side and the other side thereof in the vehicle longitudinal direction, a driving power source 40 supported by the vehicle frame 30, a variable-displacement type hydraulic pump unit 50 operatively driven by the driving power source 40, the hydraulic motor unit 100A according to the present embodiment (hereinafter referred to as first hydraulic motor unit) for operatively driving the first wheels 10, and a hydraulic motor unit 200 (hereinafter referred to as second hydraulic motor unit) for operatively driving the second wheels 20.

The first hydraulic motor unit 100A is of variable displacement type in order to compensate for a difference in turning radius between the first wheels 10 and the second wheels 20 that is caused at a turning movement of the vehicle.

More specifically, as shown in FIGS. 1A and 1B, the working vehicle 1A is configured so that a turning radius R1 of the first wheels 10 becomes smaller than a turning radius R2 of the second wheels 20, and a difference in the turning radius between the first and second wheels 10, 20 becomes larger as the turning angle of the vehicle becomes larger.

As shown in FIGS. 1A and 1B, in the present embodiment, the working vehicle 1A is of articulate type that includes, as the vehicle frame 30, first and second frames 31, 32 connected to each other in a swinging manner around a pivot shaft 35 along a substantially vertical direction.

The second wheels 20 are supported by the second frame 32. The first wheels 10 are supported by the first frame 31 in such a manner as that a distance L1 in the vehicle longitudinal direction between the pivot shaft 35 and the first wheels 10 is longer than a distance L2 in the vehicle longitudinal direction between the pivot shaft 35 and the second wheels 20.

In the configuration, the turning radius R1 of the first wheels 10 becomes smaller than the turning radius R2 of the second wheels 20, and the difference in the turning radius between the first and second wheels 10, 20 becomes larger as the turning angle of the vehicle becomes larger.

The working vehicle in which there is caused the difference in the turning radius between first and second wheels that are disposed on one and the other sides in the vehicle longitudinal direction, respectively, includes, in addition to the articulate-type working vehicle 1A, a working vehicle in which first and second wheels are supported by a rigid vehicle frame at front and rear portions thereof, respectively, and one of the first and second wheels are steering wheels.

As shown in FIG. 2, the hydraulic pump 50 includes a pump shaft 51 operatively connected to the driving power source 40, a hydraulic pump 52 supported by the pump shaft in a relatively non-rotatable manner with respect thereto, a pump housing 53 that accommodates the hydraulic pump 52 and supports the pump shaft 51 in a rotatable manner around an axis line thereof, and a pump-side volume adjusting mechanism 54 that changes a volume of the hydraulic pump 52 based on an operation from outside.

The pump housing 53 is formed with a pair of pump-side operational fluid lines 500 having first ends fluidly connected to the hydraulic pump 52 and second ends opened to an outer surface thereof to form a pair of pump-side connecting ports 500P, as shown in FIG. 2.

The pump housing 53 is further formed with a pump-side bypass line 510 that fluidly connects the pair of pump-side operational fluid lines 500, a pump-side drain line 520 that has a first end fluidly connected to the pump-side bypass line 510 and a second end opened into an inner space of the pump housing, and a pump-side bypass valve 515, as shown in FIG. 2.

The pump-side bypass valve 515 selectively takes a blocking position and a bypass-drain position. At the blocking position, the pump-side bypass valve 515 causes the pump-side bypass line 510 to be blocked and fluidly disconnects the pump-side drain line 520 from the pump-side bypass line 510. At the bypass-drain position, the pump-side bypass valve 515 causes the pump-side bypass line 510 to be in a communication state and fluidly connects the pump-side drain line 520 to the pump-side bypass line 510.

The pump housing 53 is further formed with a charge line 530.

More specifically, as shown in FIG. 2, the hydraulic pump unit 50 includes a charge pump 55 operatively driven by the pump shaft 51, in addition to the above-mentioned components.

The charge line 530 has a first end fluidly connected to a discharge side of the charge pump 55 and second ends fluidly connected to the pair of pump-side operational fluid lines 500 through a pair of check valves 535, respectively.

In FIG. 2, a reference numeral 536 denotes a charge relief valve that sets a hydraulic pressure of the charge line 530, a reference numeral 95 denotes a fluid tank functioning as a fluid source for the charge pump 55, and a reference numeral 545 denotes a filter interposed in a charge suction line 540 that fluidly connects the fluid tank 95 to a suction side of the charge pump 55.

Further, a reference numeral 550 denotes a drain line that fluidly connects the fluid tank 95 and the inner space of the pump housing 53.

The pump-side volume adjusting mechanism 54 is actuated in accordance with a manual operation on a speed-change operating member 60 provided in the working vehicle 1A.

For example, an amount of the manual operation on the speed-change operating mechanism 60 may be transmitted to the pump-side volume adjusting mechanism 54 through a mechanical link mechanism 61 (see FIG. 2).

Alternatively, the hydraulic pump unit 50 may be provided with a pump-side actuator (not shown) such as an electric motor that actuates the pump-side volume adjusting mechanism 54, and the working vehicle 1A may be provided with a speed-change-operating-side sensor (not shown) that detects a manual operation amount of the speed-change operating member 60, a speed-change-actuating-side sensor (not shown) that detects an actuating state of the pump-side actuator, and a control device 90. The control device 90 may control the pump-side actuator based on signals from the speed-change-operating-side sensor and the speed-change-actuating-side sensor so that the pump-side volume adjusting mechanism 54 is actuated in accordance with the operating amount of the speed-change operating member 60.

The second hydraulic motor unit includes a second hydraulic motor 220, a second motor shaft 210 supporting the second hydraulic motor 220 in a relatively non-rotatable manner with respect thereto, and a second motor housing 230 that accommodates the second hydraulic motor 220 and supports the second motor shaft 210 in a rotatable manner around an axis line thereof, and is of a fixed-displacement type in which the second hydraulic motor 220 has a fixed volume, as shown in FIG. 2.

The second motor housing 230 is formed with a pair of second-motor-side operational fluid lines 240 having first ends fluidly connected to the second hydraulic motor and second ends opened to an outer surface thereof to faun a pair of second-motor-side connecting ports 240P.

The second motor housing 230 is further formed with a second-motor-side bypass line 245 that fluidly connects the pair of second-motor-side operational fluid lines 240, a second-motor-side drain line 255 that has a first end fluidly connected to the second-motor-side bypass line 245 and a second end opened into an inner space of the second motor housing 230, and a second-motor-side bypass valve 250, as shown in FIG. 2.

The second-motor-side bypass valve 250 selectively takes a blocking position and a bypass-drain position. At the blocking position, the second-motor-side bypass valve 250 causes the second-motor-side bypass line 245 to be blocked and fluidly disconnects the second-motor-side drain line 255 from the second-motor-side bypass line 245. At the bypass-drain position, the second-motor-side bypass valve 250 causes the second-motor-side bypass line 245 to be in a communication state and fluidly connects the second-motor-side drain line 255 to the second-motor-side bypass line 245.

A reference numeral 260 denotes a drain line that fluidly connects the fluid tank and the inner space of the second motor housing 230.

As shown in FIG. 2, in the present embodiment, the second hydraulic motor unit 200 forms a second axle-driving device 21 that drives the second wheels 20.

More specifically, the second axle-driving device 21 includes, in addition to the second hydraulic motor unit 200, a pair of right and left second axles 22 that are connected to the pair of second wheels 20, respectively, a second differential gear mechanism 24 that receives rotational power from the second motor shaft 210 through a second speed-reduction gear train 23 and transmits the same to the pair of second axles 22 in a differential manner to each other, and a second axle housing 25 that accommodates the second speed-reduction gear train 23 and the second differential gear mechanism 24 and supports the pair of second axles 22 in a rotational manner around the respective axis lines.

The second axle housing 25 and the second motor housing 230 are integrally formed to each other.

Figure 3A:
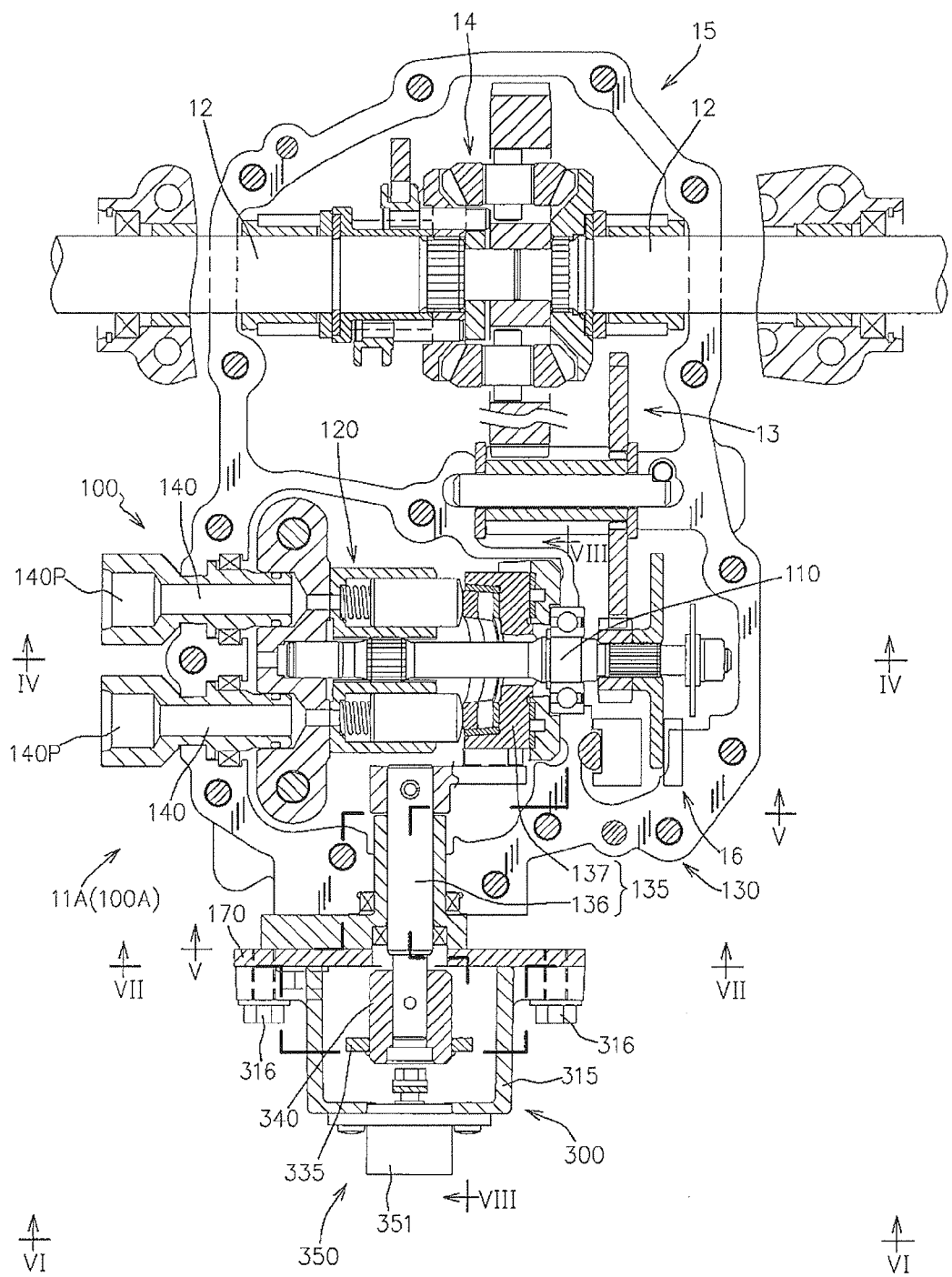
FIG. 3A is a horizontally cross-sectional plan view of the hydraulic motor unit according to the first embodiment.

FIG. 3A is a horizontally cross-sectional plan view of the first hydraulic motor unit 100A.

FIG. 4 is a cross-sectional view taken along line IV-IV in FIG. 3A.

As shown in FIGS. 2, 3A and 4, the first hydraulic motor unit 100A includes a first hydraulic motor 120, a first motor shaft 110 supporting the first hydraulic motor 120 in a relatively non-rotatable manner with respect thereto, a first motor housing 130 that accommodates the first hydraulic motor 120 and supports the first motor shaft 110 in a rotatable manner around an axis line thereof, and a motor-side volume adjusting mechanism 135 that changes a volume of the first hydraulic motor 120.

The first motor housing 130 is formed with a pair of first-motor-side operational fluid lines 140 having first ends fluidly connected to the first hydraulic motor 120 and second ends opened to an outer surface thereof to form a pair of first-motor-side connecting ports 140P.

As shown in FIG. 2, one of the pair of first-motor-side connecting ports 140P is fluidly connected to one of the pair of pump-side connecting ports 500P by way of a pump/first motor line 410. The other one of the pair of first-motor-side connecting ports 140P is fluidly connected to one of the pair of second-motor-side connecting ports 240P by way of a first motor/second motor line 420. The other one of the pair of second-motor-side connecting ports 240P is fluidly connected to the other one of the pair of pump-side connecting ports 500P by way of a pump/second motor line 430.

That is, in the present embodiment, the hydraulic pump 52, the first hydraulic motor 120 and the second hydraulic motor 220 are fluidly connected to one another in series. Accordingly, the first hydraulic motor 120 operatively driving the first wheels 10 and the second hydraulic motor 220 operatively driving the second wheels 20 are fluidly driven by the hydraulic pump 52 in a synchronized manner to each other.

The first motor housing 130 is further provided with a first-motor-side bypass line 145 that fluidly connects the pair of first-motor-side operational fluid lines 140, a first-motor-side drain line 155 that has a first end fluidly connected to the first-motor-side bypass line 145 and a second end opened into an inner space of the first motor housing 130, and a first-motor-side bypass valve 150, as shown in FIGS. 2 and 4.

The first-motor-side bypass valve 150 selectively takes a blocking position and a bypass-drain position. At the blocking position, the first-motor-side bypass valve 150 causes the first-motor-side bypass line 145 to be blocked and fluidly disconnects the first-motor-side drain line 155 from the first-motor-side bypass line 145. At the bypass-drain position, the first-motor-side bypass valve 150 causes the first-motor-side bypass line 145 to be in a communication state and fluidly connects the first-motor-side drain line 155 to the first-motor-side bypass line 145.

A reference numeral 160 denotes a drain line that fluidly connects the fluid tank 95 and the inner space of the first motor housing 130.

Figure 5:
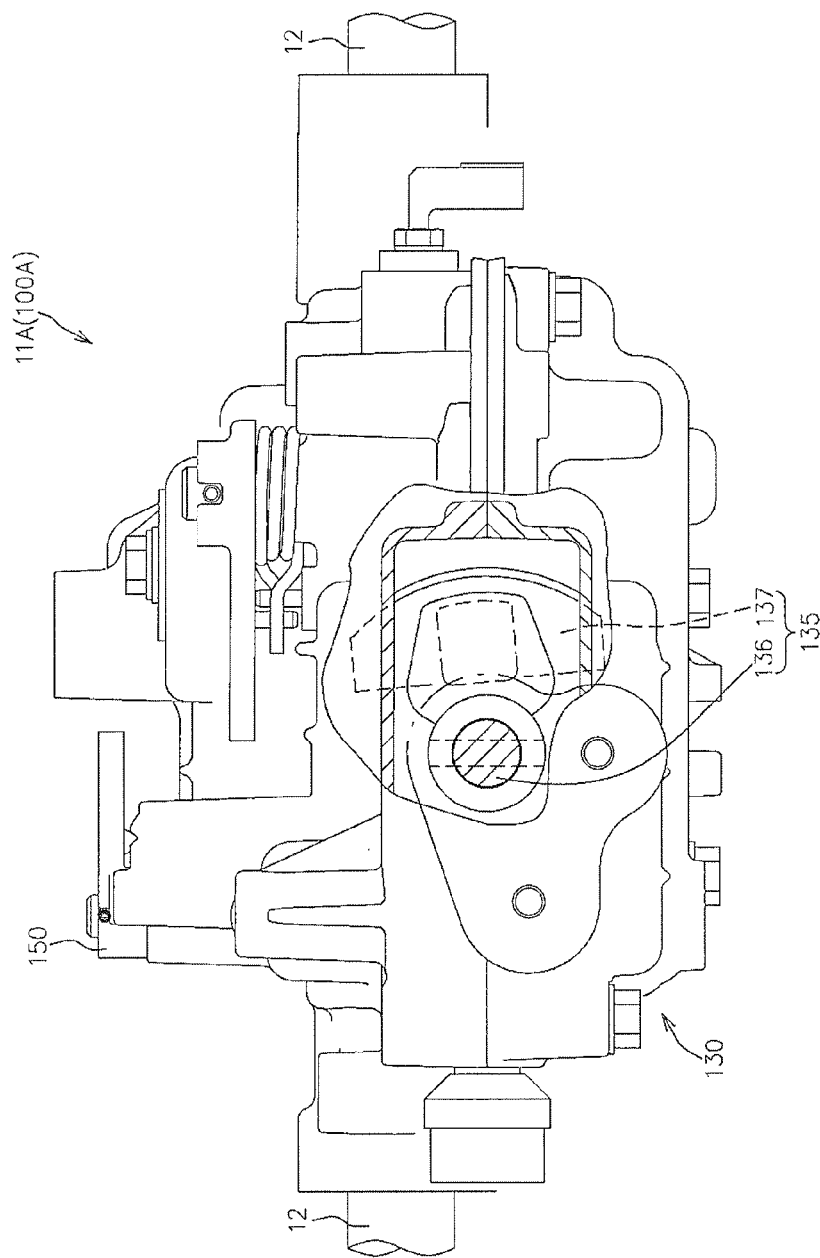
FIG. 5 is a cross-sectional view taken along line V-V in FIG. 3A.

FIG. 5 is a cross-sectional view taken along line V-V in FIG. 3A.

As shown in FIGS. 3A and 5, the motor-side volume adjusting mechanism 135 includes a motor-side control shaft 136 supported directly or indirectly by the first motor housing 130 in a rotatable manner around an axis line thereof in a state that a first end of the motor-side control shaft 136 is extended outward from the first motor housing 130, and is configured so as to change the volume of the first hydraulic motor 120 in accordance with rotation of the motor-side control shaft 136 around the axis line.

As shown in FIGS. 3A and 4, in the present embodiment, the first hydraulic motor 120 is of an axial piston type.

Therefore, as shown in FIGS. 3A, 4 and 5, the motor-side volume adjusting mechanism 135 includes, in addition to the motor-side control shaft 136, a motor-side movable swash plate 137 that could be slanted around a swinging axis line and increase and decrease the volume of the first hydraulic motor 120 in accordance with a slanted position around the swinging axis line.

The motor-side movable swash plate 137 is connected to the motor-side control shaft 136 in such a manner as to be slanted around the swinging axis line in accordance with rotation of the motor-side control shaft 136 around an axis line thereof.

As shown in FIGS. 2 and 3A, the first hydraulic motor unit 100 according to the present embodiment forms a first axle-driving device 11A that drives the pair of first wheels 10.

More specifically, the first axle-driving device 11A includes, in addition to the first hydraulic motor unit 100A, a pair of right and left first axles 12 that are connected to the pair of first wheels 10, respectively, a first differential gear mechanism 14 that receives rotational power from the first motor shaft 110 through a first speed-reduction gear train 13 and transmits the same to the pair of first axles 12 in a differential manner to each other, and a first axle housing 15 that accommodates the first speed-reduction gear train 13 and the first differential gear mechanism 14 and supports the pair of first axles 12 in a rotational manner around the respective axis lines.

The first axle housing 15 and the first motor housing 130 are integrally formed to constitute a single first housing.

In the present embodiment, as shown in FIGS. 2 and 3A, the first axle-driving device 11A is further provided with a brake mechanism 16 that selectively applies brake power to a traveling power-transmission path extending from the first motor shaft 110 to the first axles 12.

Preferably, the brake mechanism 16 is configured so as to apply the brake power to a member positioned on an upstream side of the first speed-reduction gear train 13 in a power transmitting direction.

The preferable configuration makes it possible to reduce the brake mechanism 16 in size.

In the present embodiment, the brake mechanism 16 is configured so as to apply the brake power to the first motor shaft 110, as shown in FIG. 3A.

For example, a first end of the first motor shaft 110 may be extended outward from the first housing 130 to support a cooling fan 17, as shown in FIG. 3B.

The configuration makes it possible to effectively cool the first axle-driving device 11A including the first hydraulic motor unit 100A.

Figure 6:
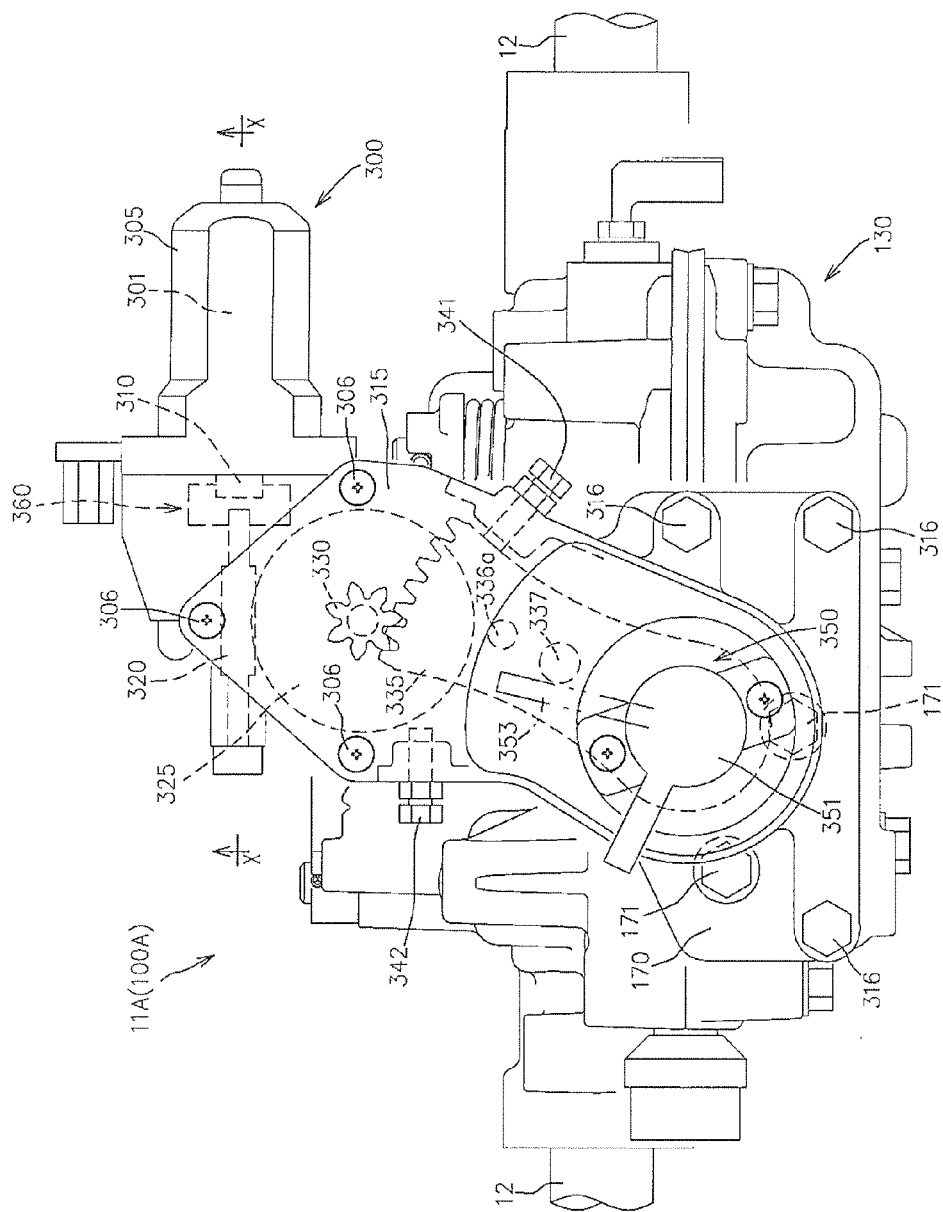
FIG. 6 is a cross-sectional view taken along line VI-VI in FIG. 3A.

FIG. 6 is a cross-sectional view taken along line VI-VI in FIG. 3A.

Figure 7:
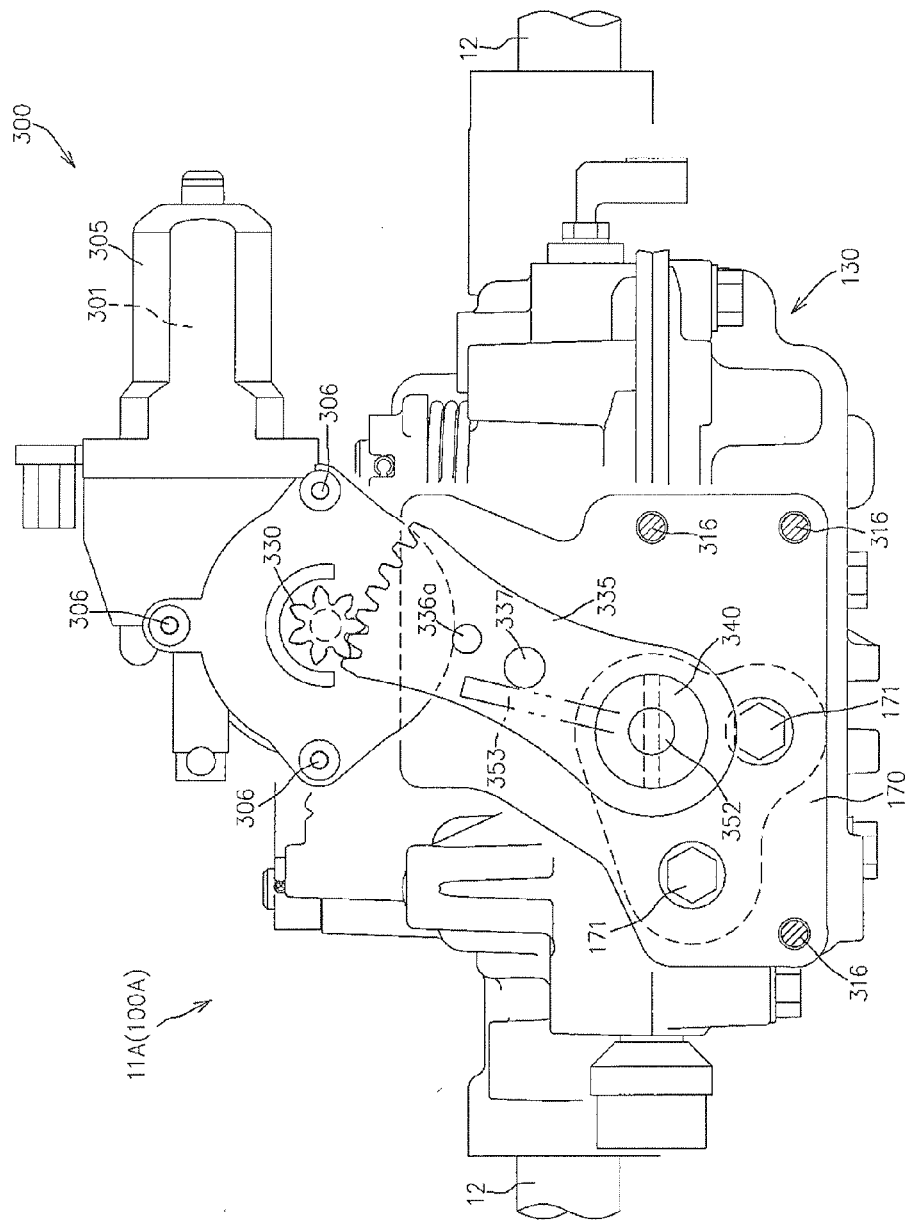
FIG. 7 is a cross-sectional view taken along line VII-VII in FIG. 3A.
Figure 8:
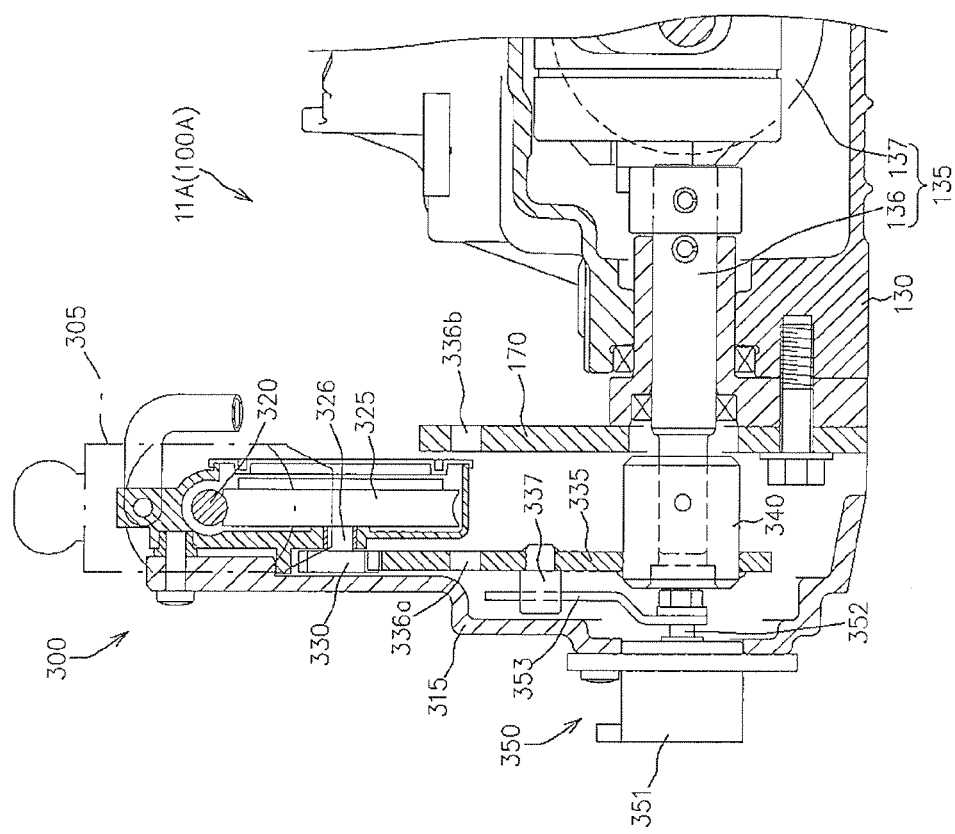
FIG. 8 is a cross-sectional view taken along line VIII-VIII in FIG. 3A.

FIGS. 7 and 8 are cross-sectional views taken along line VII-VII and line VIII-VIII in FIG. 3A, respectively.

As shown in FIGS. 2 and 6 to 8, the first hydraulic motor unit 100A includes an electric motor 300 in addition to the components mentioned above.

The electric motor 300 includes an electric motor main body 301 that is controlled and driven based on an electric signal, an electric motor case 305 that accommodates the electric motor main body 301, and an electric motor main body output shaft 310 that is rotated around an axis line thereof by the electric motor main body 305.

The electric motor case 305 is detachably connected to the first motor housing 130 in a direct or indirect manner.

In the present embodiment, the electric motor case 305 is connected to the first motor housing 130 through an electric motor cover 315.

More specifically, the first hydraulic motor unit 100A includes the electric motor cover 315 to which the electric motor case 305 is connected and that is detachably connected to the first motor housing 130 in a state that the electric motor case 305 is connected to the electric motor cover 315.

In the present embodiment, as shown in FIGS. 3A and 6 to 8, a plate member 170 is detachably connected to the first motor housing 130 by way of tightening member 171 such as volt. The plate member 170 is formed with an opening through which the first end of the motor-side control shaft 136 is inserted.

The electric motor cover 315 with the electric motor case 305 being connected thereto is detachably connected to the plate member 170 such as tightening member 316 such as volt.

The electric motor case 305 is detachable connected to the electric motor cover 315 by way of tightening member 306 such as volt.

The first hydraulic motor unit 100A is configured so that the electric motor main body output shaft 310 is operatively connected to the first end of the motor-side control shaft 136 upon mounting of the electric motor 300 to the first motor housing 130.

More specifically, in the first hydraulic motor unit 100A, the motor-side control shaft 136 is rotated around its axis line in accordance with rotation of the electric motor main body output shaft 310, whereby the volume of the first hydraulic motor 120 is changed.

According to the thus configured first hydraulic motor unit 100A, without mechanically and operatively connecting a steering operation member 65 that is provided in the working vehicle to the motor-side volume adjusting mechanism 135, it is possible to actuate the motor-side volume adjusting mechanism 135 in accordance with manual operation on the steering operation member 65 by electrically controlling the electric motor main body 301 in accordance with manual operation amount of the steering operation member 65.

Accordingly, it is possible to change the volume of the first hydraulic motor 120 in accordance with manual operation on the steering operation member 65 without a complicated mechanical link structure.

Figure 9:
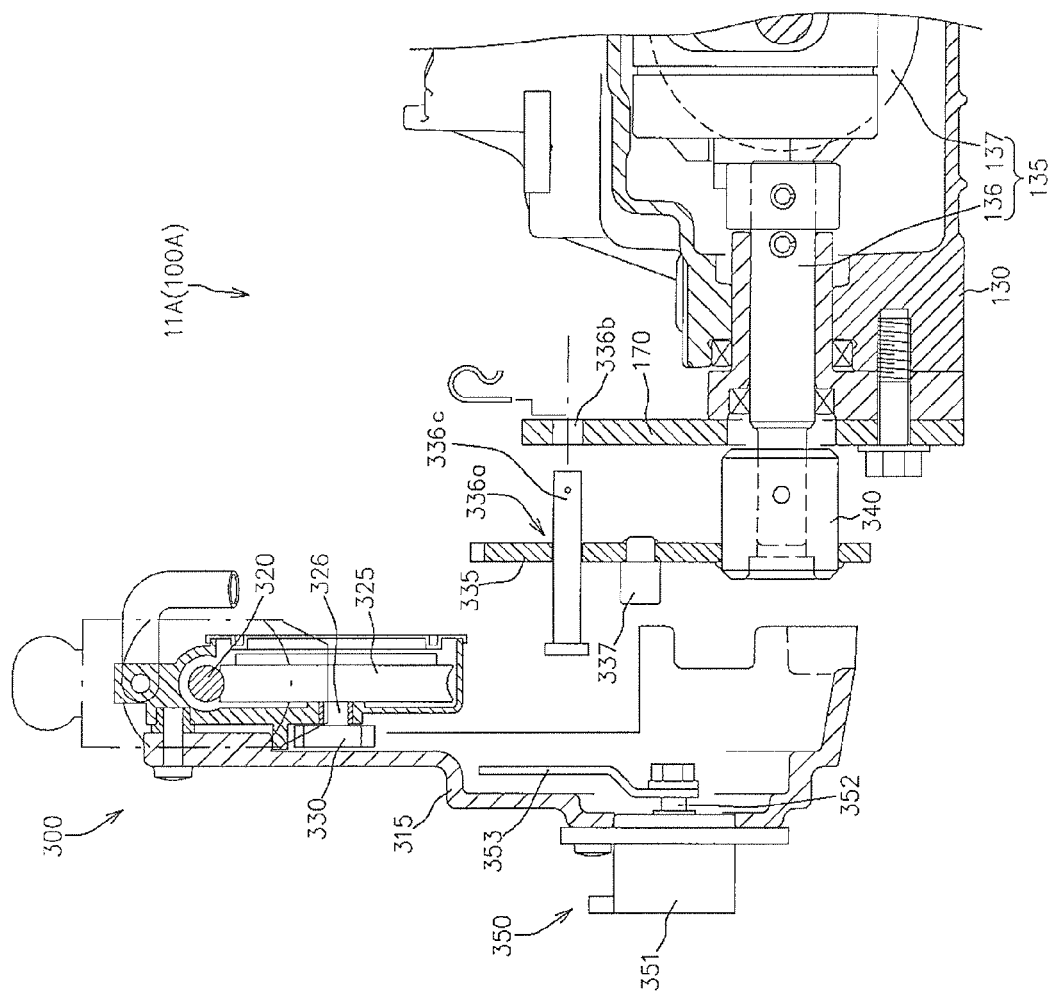
FIG. 9 is an exploded view of FIG. 8.

FIG. 9 is an exploded cross-sectional view in a state that the electric motor cover 315 is separated from the first motor housing 130.

As shown in FIGS. 6 to 9, in the present embodiment, the electric motor 30 includes an operation shaft 340 mounted to the motor-side volume adjusting mechanism 135, a sector gear 335 connected to the operation shaft 340, and an electric motor output gear 330 operatively connected to the electric motor main body output shaft 310.

More specifically, the operation shaft 340 is connected to the first end of the motor-side control shaft 136 in a relatively non-rotatable manner around the axis line with respect thereto.

The sector gear 335 extends in a direction orthogonal to the motor-side control shaft 136 in a state of having a proximal end connected to the operation shaft 340 and a free end to which a gear is mounted.

The electric motor output gear 330 is supported directly or indirectly by the electric motor case 305 so as to be operatively connected to the electric motor main body output shaft 310 and be engaged with the sector gear 335 upon connection of the electric motor cover 315 to the first motor housing 130.

The configuration makes it possible to easily and detachably connect the electric motor 300 to the first motor housing 130 while allowing the electric motor main body output shaft 310 to be operatively connected to the motor-side control shaft 136 upon mounting of the electric motor 300 to the first motor housing 130.

Preferably, as shown in FIG. 6, the first hydraulic motor unit 100A may be provided with a first adjusting screw 341 and a second adjusting screw 342. The first adjusting screw 341 is screwed into a fixed member such as the electric motor cover 315 so that its distal end is brought into contact with the sector gear 335 to define a first end, which is positioned on one side around the operation shaft 340, of a swing range of the sector gear 335 around the operation shaft 340. The second adjusting screw 342 is screwed into the fixed member so that its distal end is brought into contact with the sector gear 335 to define a second end, which is positioned on the other side around the operation shaft 340, of the swing range of the sector gear 335 around the operation shaft 340.

The provision of the first and second adjusting screws 341, 342 makes it possible to precisely set a variable displacement range of the first hydraulic motor 120 while reducing or preventing additional member as much as possible.

In the present embodiment, the electric motor cover 315 is utilized as the fixed member, as shown in FIG. 6. However, it is of course possible to utilize as the fixed member the first motor housing 130 or the plate member 170 fixed to the first motor housing 130.

In the first hydraulic motor unit 100A according to the present embodiment, as shown in FIGS. 6, 8 and 9, the sector gear 335 is formed with a pass-through hole 336a that has an axis line along the axis line of the operation shaft 340. On the other hand, the first motor housing 130 or the fixed member such as the plate member 170 fixed to the first motor housing 130 is formed with a fixing hole 336b at a position that faces the pass-through hole 336a at the time when the sector gear 335 is positioned at a predetermined position around the operation shaft 340.

According to the configuration, by removing the electric motor cover 315 from the first motor housing 130 and then inserting a fixing pin 336c into the pass-through hole 336a and the fixing hole 336b when the electric motor 300 has a breakdown or the like, it is possible to fix the sector gear 335 at a predetermined position around the operation shaft 340 to fix the volume of the first hydraulic motor 120 at a predetermined volume corresponding to the predetermined position.

In the present embodiment, the electric motor 300 includes, in addition to the components, a sensor unit 350 that detects a rotational amount of the operation shaft 340 around the axis line, as shown in FIGS. 3A, 8 and 9.

More specifically, the sensor unit 350 includes a sensor housing 351, a sensor shaft 352, a sensor arm 353, a biasing member (not shown), and a sensor main body (not shown), as shown in FIGS. 6 to 9. The sensor housing 351 is mounted to the electric motor cover 315. The sensor shaft 352 is supported by the sensor housing 351 in a rotatable manner around its axis line so as to be coaxial with the operation shaft 340 in a state that the electric motor cover 315 is connected to the first motor housing 130. The sensor arm 353 extends in a direction orthogonal to the operation shaft 340 in a state of having a proximal end portion connected to the sensor shaft 352. The biasing member biases toward one side around the sensor shaft 352 a detected body that is formed by the sensor shaft 352 and the sensor arm 353. The sensor main body detects rotational amount of the sensor shaft 352 around the axis line.

The sector gear 335 is provided with an engagement pin 337 that extends parallel to the operation shaft 340. At the time when the electric motor cover 315 with the sensor unit 350 is connected to the first motor housing 130, the sensor arm 353 that is biased toward one side around the sensor shaft 352 by the biasing member is engaged with the engagement pin 337.

The configuration makes it possible to cause the sensor arm 353 to engage with the engagement pin 337 in such a manner as that the sensor arm 353 rotates around the sensor shaft 352 in accordance with rotation of the sector gear 335 around the operation shaft 340 while allowing the sensor arm 353 to move along the axis line direction of the sensor shaft 352 relative to the engagement pin 337, when the electric motor cover 315 with the sensor unit 350 is connected to the first motor housing 130.

Accordingly, it is possible to detect the position of the sector gear 335 around the operation shaft 340 (that is, the position of the motor-side control shaft 136 around its axis line) by the sensor unit 350 without worsening capability of mounting and removing the electric motor 300 to and from the first hydraulic motor unit 100A.

In the present embodiment, as shown in FIG. 6, the electric motor 300 is further provided with a worm shaft 320 and a clutch mechanism 360. The worm shaft 320 is positioned coaxially with the electric motor main body output shaft 310, and is operatively connected to the electric motor output gear 330 in such a manner as that the electric motor output gear 330 is rotated in accordance with rotation of the worm shaft 320 around its axis line. The clutch mechanism 360 is provided between the electric motor main body output shaft 310 and the worm shaft 320 in such a manner as to allow rotational power to be transmitted from the electric motor main body output shaft 310 to the worm shaft 320 while preventing rotational power from being transmitted in a reverse direction.

In the present embodiment, as shown in FIG. 6, the electric motor 300 is further provided with a transmission gear 325 that is engaged with the worm shaft 320 and a transmission shaft 326 that supports the transmission gear 325 in a relatively non-rotatable manner with respect thereto, wherein the electric motor output gear 330 has a diameter smaller than that of the transmission gear 325 and is supported by the transmission shaft 326 in a relatively non-rotatable manner with respect thereto.

That is, the worm shaft 320 is operatively connected to the electric motor output gear 330 through the transmission gear 325 and the transmission shaft 326.

FIG. 10 is a cross-sectional view of the clutch mechanism 360 that is taken along line X-X in FIG. 6.

Figure 11A:
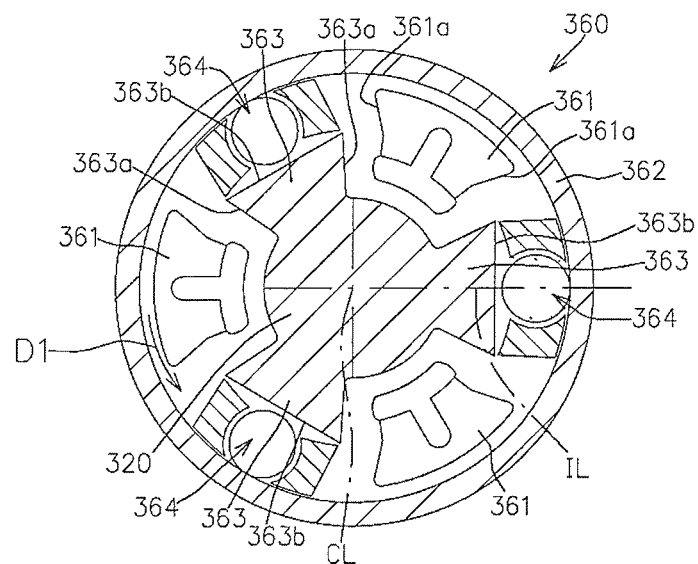
FIG. 11 is a cross-sectional view taken along line XI-XI in FIG. 10.
Figure 11B:
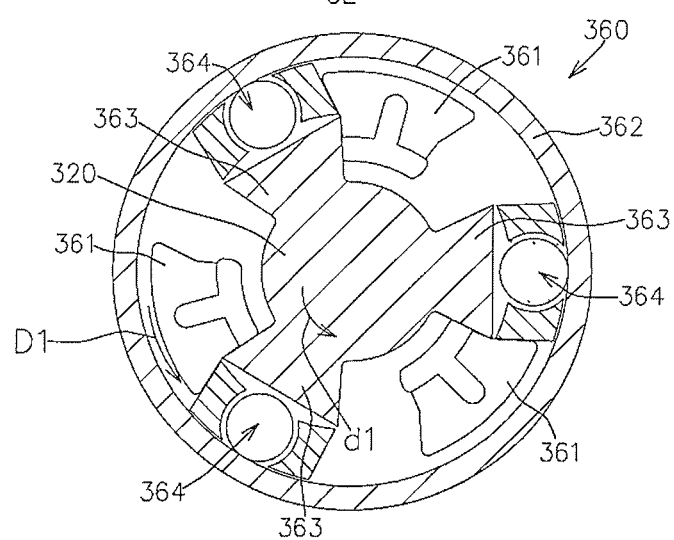

FIG. 11 is a cross-sectional plan view of the clutch mechanism 360 that is taken along line XI-XI in FIG. 10.

As shown in FIGS. 10 and 11, the clutch mechanism 360 includes a driving-side arm 361 that is provided at an distal end of the electric motor main body output shaft 310 so as to extend radially outward, a collar member 362 that surrounds the driving-side arm 361, a driven-side arm 362 that is provided at the end of the worm shaft 320 closer to the electric motor main body output shaft 310 so as to extend radially outward, and a contact member 364 that is disposed between the driven-side aim 363 and the collar member 362 with respect to a radial direction with the axis line CL of the electric motor main body output shaft 310 and the worm shaft 320 being as a reference.

The driving-side arm 361 has side surfaces 361a facing in a circumferential direction with the axis line CL of the electric motor main body output shaft 310 being as a reference, and the side surfaces 361a are configured so as to press, in the circumferential direction, side surfaces 363a and 364a of the driven-side arm 363 and the contact member 364 that face in the circumferential direction.

The driven-side aim 363 has an outer end surface 363b that faces radially outward, the outer end surface 363b being substantially perpendicular to a virtual line IL connecting a circumferential center of the outer end surface 363b and the axis line CL of the electric motor main body output shaft 310 and the worm shaft 320 when seen along the axis line CL.

The clutch mechanism 360 thus configured is actuated as follows.

When the electric motor main body 301 is rotated in either one direction (hereinafter, referred to as a first direction D1) of a first direction (normal rotation direction for causing the working vehicle 1A to travel forward, for example) and a second direction (reverse rotation direction for causing the working vehicle 1A to travel rearward, for example) around the axis line (see FIG. 11A), the driving-side arm 361 presses both the driven-side arm 363 and the contact member 364 into the first direction D1. Accordingly, the worm shaft 320 is rotated in a direction d1 identical with the first direction D1 (see FIG. 11B) so that the movable swash plate 137 is slanted into a direction corresponding to the first direction D1.

The hydraulic pressure of the operational fluid that the first hydraulic motor 120 suctions and discharges may function as power applied to the movable swash plate 137 for slanting the same in a direction toward a neutral position. Further, in accordance with needs, the hydraulic motor unit 100A may further include a neutral spring 120 that bias the movable swash plate 137 toward the neutral position.

Therefore, when the electric motor 300 is in non-actuation state, the movable swash plate 137 is slightly slanted toward the neutral position against the inertial force of the electric motor 300.

Figure 11C:
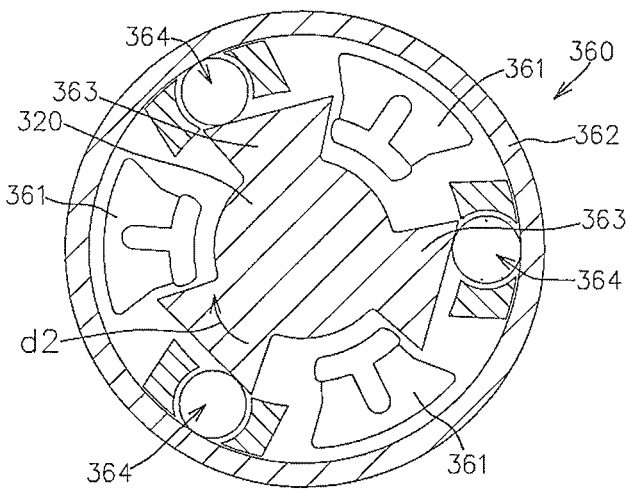

In accordance with this slanting, as shown in FIG. 11C, the worm shaft 137 that is operatively connected to the movable swash plate 137 is rotated in a second direction d2 corresponding to the direction toward the neutral position, while the position of the freely provided contact member 364 being unchanged.

As described above, the outer end surface 363b of the driven-side arm 363 is substantially perpendicular to the virtual line IL connecting the circumferential center of the outer end surface 363b and the axis line CL of the worm shaft 320. Therefore, rotation of the driven-side arm 363 into the second direction d2 causes the contact member 364 to be pressed to the inner circumferential surface of the collar member 362, so that the worm shaft 320 is in a locked state incapable of being rotated (see FIG. 11C).

As a result, it is possible to effectively prevent the movable swash plate 137 from unintentionally slanting from a predetermined slanting position after the electric motor 320 locates the movable swash plate 137 at the predetermined slanting position.

A control method for the electric motor 300 of the working vehicle 1A will be now explained.

As explained above, in the working vehicle 1A, the hydraulic pump unit 50 fluidly drives the first and second hydraulic motor units 100A, 200, which operatively drive the first and second wheels 10, 20, respectively, in a synchronized manner to each other. The first wheels 10 have a turning radius R1 that become smaller than a turning radius R2 of the second wheels 20 as turning angle of the vehicle becomes greater.

The working vehicle 1A adopts, as the first hydraulic motor unit 100A operatively driving the first wheels 10, a variable-displacement-type hydraulic motor unit capable of changing the volume of the first hydraulic motor 120 by electrically controlling the electric motor 300, in order to compensate for a difference in turning radius caused between the first and second wheels 10, 20.

More specifically, as shown in FIG. 2, the working vehicle 1A includes a turning-operation-side sensor 66 that detects a steering angle and the control device 90 that controls actuation of the electric motor 300, in addition to the vehicle frame 30, the first and second wheels 10, 20, the driving power source 40, the hydraulic pump unit 50, the first hydraulic motor unit 100A and the second hydraulic motor unit 200.

The motor-side volume adjusting mechanism 135 of the first hydraulic motor unit 100A is configured so as to change the volume of the first hydraulic motor 120 within a range including a standard volume and a first volume that is larger than the standard volume, the standard volume being set to cause peripheral speed of the first wheels 10 operatively driven by the first hydraulic motor 120 to be equal to peripheral speed of the second wheels 20 operatively driven by the second hydraulic motor 220.

For example, if the first wheels 10 and the second wheels 10 have the same outer diameter, the standard volume is become equal to a fixed volume of the second hydraulic motor 220.

The first volume may be preferably set to reduce the peripheral speed of the first wheels 10 in such a manner as to compensate for the difference in tuning radius induced between the first and second wheels 10, 20 at the time when the working vehicle 1A makes a maximum turn.

The control device 90 includes a normal mode that controls actuation of the electric motor main body 301 based on signals from the turning-operation-side sensor 66 and the sensor unit 350 functioning as a tuning-actuation-side sensor in such a manner as that the volume of the first hydraulic motor 120 is changed from the standard volume to the first volume as the working vehicle 1A is shifted from straight traveling state to maximum turning state.

The configuration makes it possible to operatively drive the first and second wheels 10, 20 by the first and second hydraulic motor units 100A, 200, respectively, without inducing slippages and drags of the first and second wheels 10, 20, in the working vehicle configured so that the turning radius R1 of the first wheels 10 becomes farther smaller than the turning radius R2 of the second wheels 20 as the turning angle of the vehicle becomes larger, and the first and second wheels 10, 20 are operatively driven by the first and second hydraulic motor units 100A, 200 that are hydraulically driven by the hydraulic pump unit 50 in a state of being synchronized manner to each other.

In the present embodiment, the control device 90 includes a torque-up mode that keeps the volume of the first hydraulic motor 120 at the first volume regardless of the turning angle of the working vehicle 1A, in addition to the normal mode.

The control device 90 is provided with the normal mode and the torque-up mode that is selectively activated as described above. The configuration makes it possible to be flexibly compatible with various traveling conditions.

The torque-up mode could be selected, for example, at the time when the vehicle travels upward on slope, in particular, in a situation where larger traveling drive torque is needed such as when the vehicle starts to travel in an upward direction on slope.

More specifically, at the time when the vehicle travels upward on slope, larger load is applied on wheels that are positioned on a side opposite to a traveling direction of the vehicle. In the present embodiment, the first wheels 10, which are positioned so that the distance L1 from the pivot shaft 3 in the vehicle longitudinal direction is longer than that in the second wheels, are adopted as front wheels. In the thus configured vehicle, at the time when the vehicle travels upward on slope with rearward movement, larger load is applied on the first wheels 10 rather than the second wheels 10, whereby the first hydraulic motor unit 100A driving the first wheels 10 is required to output larger drive torque. Accordingly, the working vehicle 1A in the present embodiment, the torque-up mode is preferably selected at the time when the vehicle travels upward on slope with rearward movement.

Unlike the working vehicle 1A in the present embodiment, in a case of working vehicle where the first wheels 10, which are positioned so that the distance L1 from the pivot shaft 3 in the vehicle longitudinal direction is longer than that of the second wheels, are adopted as rear wheels, and a hydraulic motor unit operatively driving the front wheels 10 is of variable-displacement-type, larger load is applied on the first wheels 10 at the time when the vehicle travels upward on slope with forward movement. Therefore, the torque-up mode is preferably selected at the time when the vehicle travels upward on slope with forward movement.

It is of course that the torque-up mode may be selected at the time when the vehicle travels on punishing road such as bumpy road or muddy road in addition to the time when the vehicle travels on slope.

By the way, since the torque-up mode holds the volume of the first hydraulic motor 120 at the first volume regardless of the turning angle of the vehicle, it causes the peripheral speed of the first wheels 10 to differ from that of the second wheels 20 at the time when the vehicle travels straight, resulting in slippages and drags of the first and second wheels 10, 20.

Accordingly, it is preferable to limit the activation of the torque-up mode within requisite minimum.

In the present embodiment, in consideration of this point, torque-up mode is activated only at the time when the vehicle starts to travel in a state where an operator intentionally selects the torque-up mode.

More specifically, the working vehicle 1A further includes a traveling-speed sensor 62 that detects a traveling speed of the vehicle, and a torque-up switch 70 capable of being manually operated, as shown in FIG. 2.

The control device 90 is configured so as to activate the torque-up mode at the time when the vehicle starts to travel in a state where the torque-up mode has been selected by the torque-up switch 70, and shift the torque-up mode to the normal mode upon attainment of traveling speed to a predetermined speed and/or manipulation of the torque-up switch 70 for canceling the torque-up mode.

The first hydraulic motor unit 100A according to the present embodiment is configured so that the first hydraulic motor 120 is disposed independently from the hydraulic pump 52. However, the hydraulic motor unit according to the present invention is not limited to the configuration.

Figure 12:
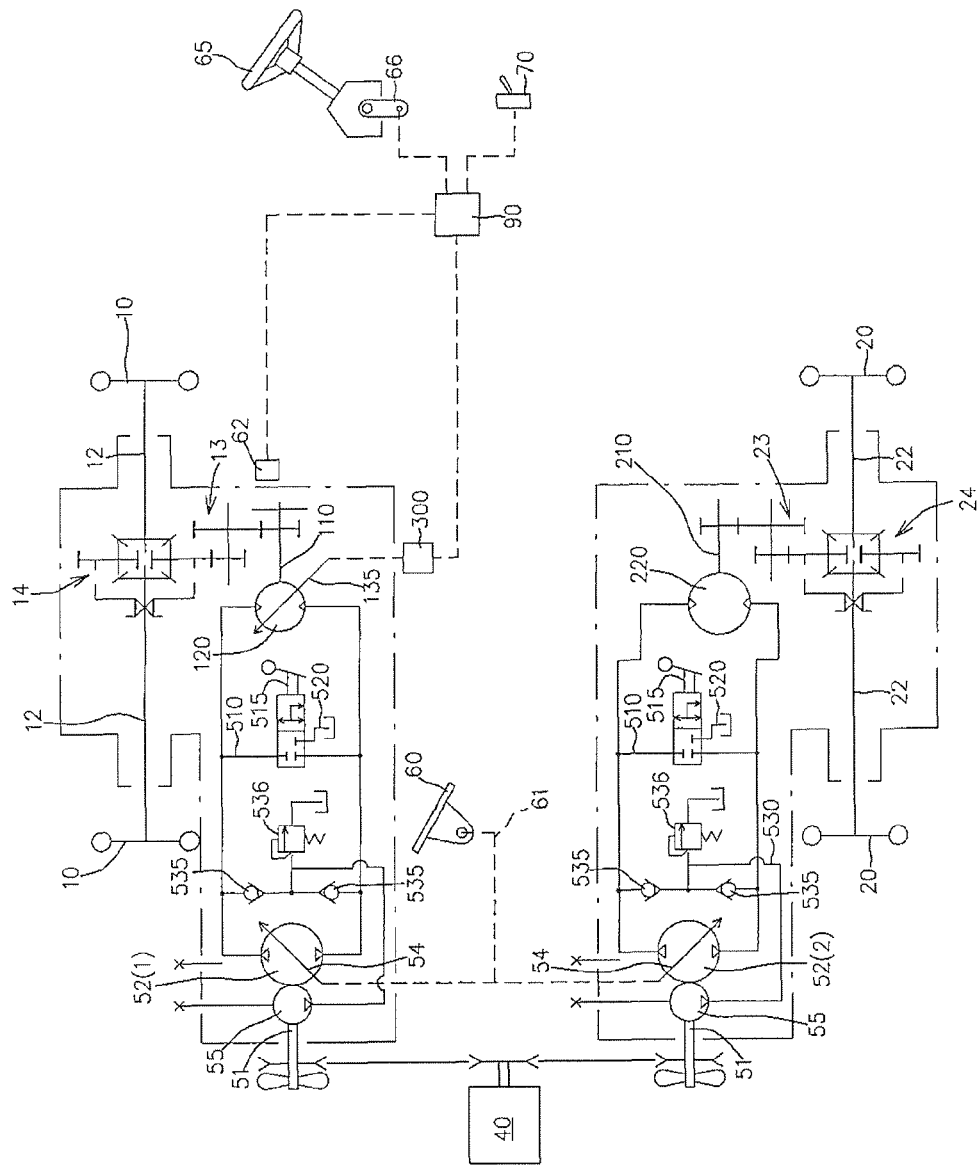
FIG. 12 is a hydraulic circuit diagram of a hydraulic four-wheel-drive working vehicle to which a modification of the hydraulic motor unit according to the present invention is applied.

For example, as shown in FIG. 12, the hydraulic motor unit according to the present invention includes an integral first HST where the first hydraulic motor 120, whose volume is changed through the motor-side volume adjusting mechanism 135 operated by the electric motor 300, is accommodated along with a cooperating first hydraulic pump unit 52(1) within a single first housing.

Furthermore, the configuration in which the first and second hydraulic motor units 120, 220 are hydraulically driven by the hydraulic pump in a state of being synchronized to each other includes an embodiment in which the single hydraulic pump 52, the first hydraulic motor 120 and the second hydraulic motor 220 are connected in serried to one another as in the present embodiment shown in FIG. 2, and also an embodiment that includes a first hydraulic pump 52(1) fluidly connected to the first hydraulic motor 120 and a second hydraulic pump 52(2) fluidly connected to the second hydraulic motor 220, volumes of the first and second hydraulic pumps 52(1), 52(2) being changed in a synchronized manner to each other, as shown in FIG. 12.

Second Embodiment

Hereinafter, another embodiment of the hydraulic motor unit according to the present invention will be described, with reference to the attached drawings.

Figure 13:
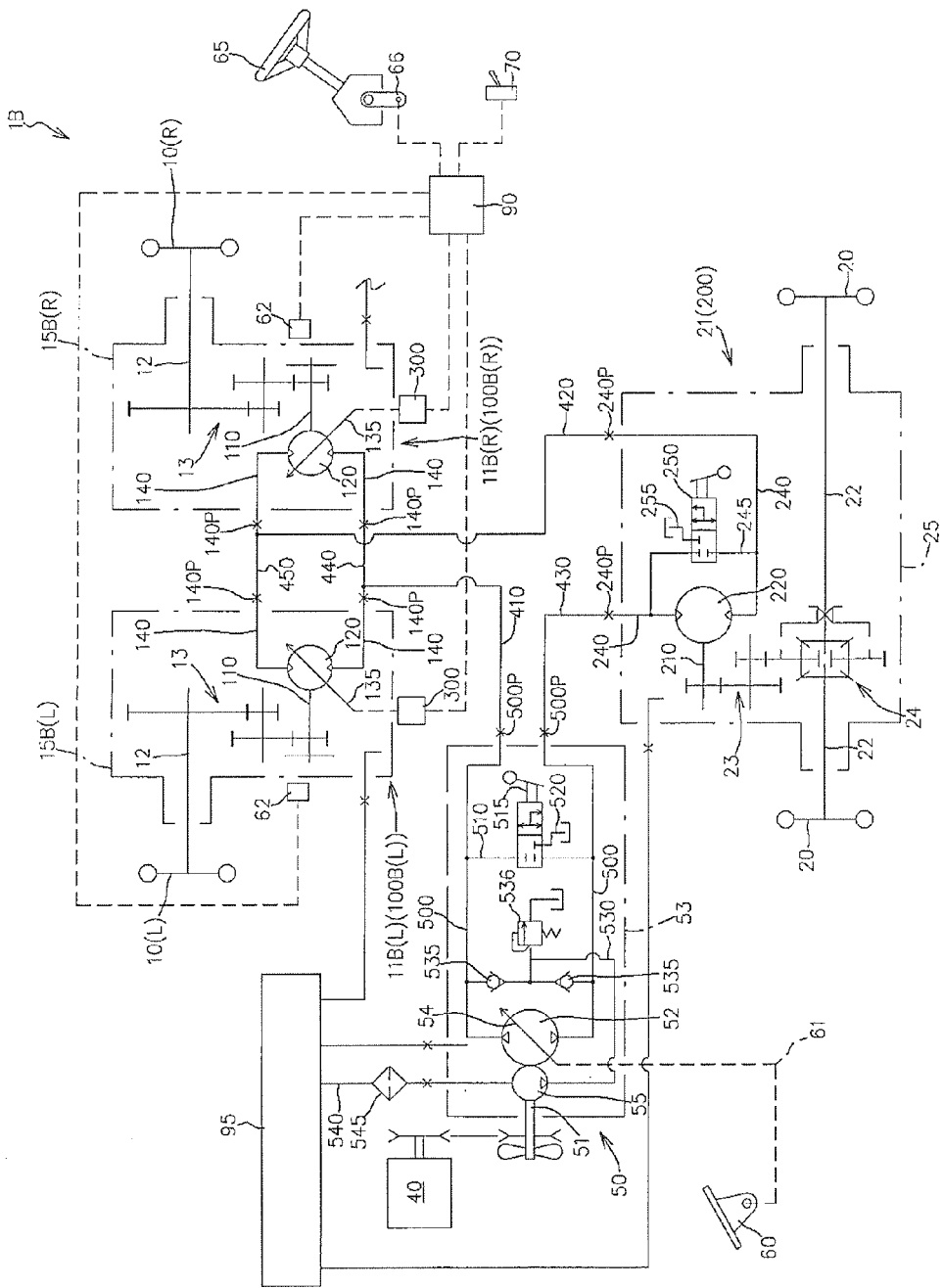
FIG. 13 is a hydraulic circuit diagram of a hydraulic four-wheel-drive working vehicle to which a hydraulic motor unit according to a second embodiment of the present invention is applied.

FIG. 13 is a hydraulic circuit diagram of a hydraulic four-wheel-drive working vehicle to which a hydraulic motor unit 100B according to the present embodiment is applied.

In the drawing, the members same as those in the first embodiment are denoted by the same reference numerals to omit detailed description thereof.

The hydraulic motor unit 100A according to the first embodiment forms the first axle-driving device 11A that differentially transmits rotational power from the hydraulic motor 120 to the pair of first wheels 10 through the mechanical first differential gear mechanism 14.

On the other hand, the hydraulic motor unit 100B according to the present embodiment forms a first axle-driving device 11B that transmits rotational power from the hydraulic motor 120 only to a corresponding one first wheel 10 out of the pair of first wheels 10.

More specifically, as shown in FIG. 13, the working vehicle 1B includes the vehicle frame 30, the pair of right and left first wheels 10 and the pair of right and left second wheels 20, the driving power source 40, the variable-displacement type hydraulic pump unit 50, one hydraulic motor unit 100B according to the present embodiment (hereinafter referred to as left-side first hydraulic motor unit 100B(L)) for operatively driving a left-side first wheel 10(L), another hydraulic motor unit 100B according to the present embodiment (hereinafter referred to as right-side first hydraulic motor unit 100B(R)) for operatively driving a right-side first wheel, the second hydraulic motor unit 200 operatively driving the pair of second wheels 20, the speed-change operating member 60 that is manually operated for changing the volume of the hydraulic pump of the hydraulic pump unit 50, the steering operation member 65, the turning-operation-side sensor 66, and the control device 90.

As shown in FIG. 13, the working vehicle 1B could be provided with the torque-up switch 70 as in the working vehicle 1A according to the first embodiment.

Figure 14:
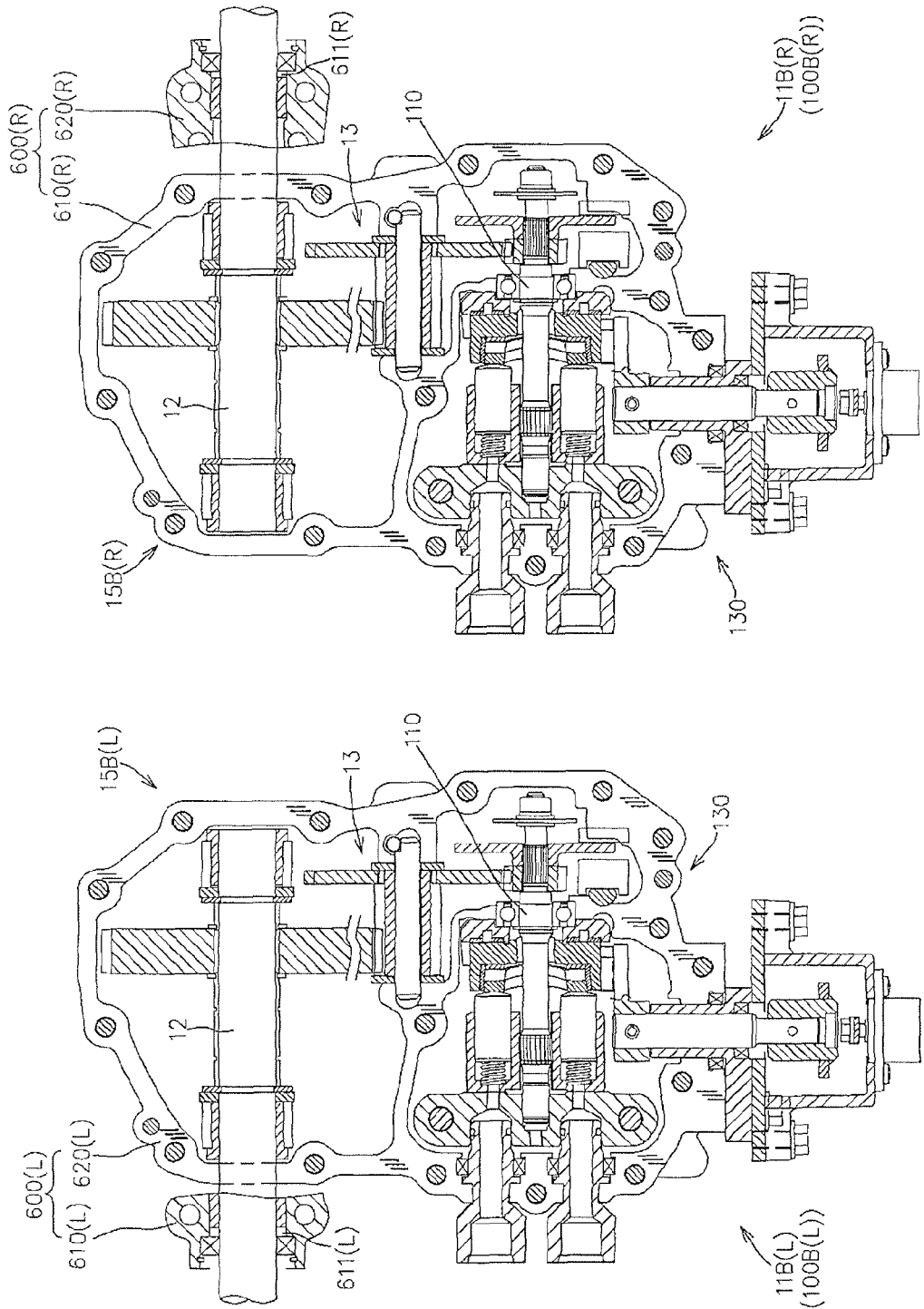
FIG. 14 is a horizontally cross-sectional plan view of the hydraulic motor units according to the second embodiment, one hydraulic motor unit is configured so as to operatively drive a left-side wheel, and the other one hydraulic motor unit is configured so as to operatively drive a right-side wheel.

FIG. 14 is a cross-sectional plan view of the left-side and right-side first hydraulic motor units 100B(L), 100B(R).

As shown in FIGS. 13 and 14, the left-side and right-side first hydraulic motor units 100B(L), 100B(R) form left-side and right-side first axle-driving devices 11B(L), 11B(R) that drive the left-side and right-side first wheels 10(L), 10(R), respectively.

The left-side and right-side first hydraulic motor units 100B(L), 100B(R) have the substantially same configuration as the first hydraulic motor unit 100A according to the first embodiment.

Accordingly, in the drawing, the members same as those in the first hydraulic motor unit 100A are denoted by the same reference numerals to omit detailed description of the left-side and right-side first hydraulic motor units 100B(L), 100B (R).

The left-side axle-driving device 11B(L) includes the left-side first hydraulic motor unit 100B(L), the first axle 12 connected to the left-side first wheel 10(L), the first speed-reduction gear train 13 that reduces the speed of rotational power from the first motor shaft 110 and transmits the same to the first axle 12, and a left-side first axle housing 15B(L) that accommodates the first speed-reduction gear train 13 and supports the first axle 12 in a rotatable manner around the axis line. In the present embodiment, the left-side first axle housing 15B(L) and the first motor housing 130 are formed integrally to each other to constitute a single left-side first housing 600(L).

The right-side axle-driving device 11B(R) has the same configuration as the left-side axle-driving device 11B(L) except that the left-side first axle housing 15B(L) is changed to a right-side first axle housing 15B(R).

More specifically, the right-side axle-driving device 11B (R) includes the right-side first hydraulic motor unit 100B(R) that has the same configuration as the left-side first hydraulic motor unit 100B(L), the first axle 12 connected to the right-side first wheel 10(R), the first speed-reduction gear train 13 that reduces the speed of rotational power from the first motor shaft 110 and transmits the same to the first axle 12, and the right-side first axle housing 15B(R) that accommodates the first speed-reduction gear train 13 and supports the first axle 12 in a rotatable manner around the axis line. In the present embodiment, the right-side first axle housing 15B(R) and the first motor housing 130 are formed integrally to each other to constitute a single right-side first housing 600(R).

The left-side first housing 600(L) includes upper and lower housings 610(L), 620(L) that are connected to each other in a detachable manner along a vertical direction.

In the same way, the right-side first housing 600(R) includes upper and lower housings 610(R), 620(R) that are connected to each other in a detachable manner along a vertical direction.

Preferably, the upper housings 610(L), 610(R) of the left-side and right-side first housings 600(L), 600(R) support the corresponding first axles 12 in a rotatable manner around the respective axis lines.

That is, the left-side first axle 12 is supported by the upper housing 610(L) of the left-side first housing 600(L) in a rotatable manner around the axis line in a state where a first end thereof is extended outward through a pass-through hole 611(L) formed in the upper housing 610(L). The right-side first axle 12 is supported by the upper housing 610(R) of the right-side first housing 600(R) in a rotatable manner around the axis line in a state where a first end thereof is extended outward through a pass-through hole 611(R) formed in the upper housing 610(R).

The preferable configuration makes it possible to standardize the lower housings 620(L), 620(R) of the left-side and right-side first housings 600(L), 600(R).

Accordingly, the components of left-side and right-side first axle-driving devices 11B(L), 11B(R) could be made same to each other except for the upper housings 620(L), 620(R), thereby realizing cost reduction due to standardization of component.

In the working vehicle 1B, as shown in FIG. 13, the hydraulic motors 120 of the left-side and right-side first hydraulic motor units 100B(L), 100B(R) are fluidly connected in parallel to the hydraulic pump 52, whereby the pair of first axles 10 are driven in a differential manner to each other with utilizing hydraulic function.

More specifically, one of a pair of first motor-side connecting ports in the left-side first hydraulic motor unit 100B(L) and one of a pair of first motor-side connecting ports in the right-side first hydraulic motor unit 100B(R) are fluidly connected to each other by a first motor-side forward-movement high-pressure connecting line 440. The other one of the pair of first motor-side connecting ports in the left-side first hydraulic motor unit 100B(L) and the other one of the pair of first motor-side connecting ports in the right-side first hydraulic motor unit 100B(R) are fluidly connected to each other by a first motor-side rearward-movement high-pressure connecting line 450.

The first motor-side forward-movement high-pressure connecting line 440 is fluidly connected to one of the pair first-motor-side connecting ports 140P by the pump/first motor line 410, and the first motor-side rearward-movement high-pressure connecting line 450 is fluidly connected to one of the pair of second-motor-side connecting ports 240P by the first motor/second motor line 420.

Furthermore, in the working vehicle 1B, as shown in FIG. 13, the electric motors of the left-side and right-side first hydraulic motor units 100B(L), 100B(R) are controlled by the control device 90 in a synchronized manner to each other.

Third Embodiment

Hereinafter, still another embodiment of the hydraulic motor unit according to the present invention will be described, with reference to the attached drawings.

Figure 15:
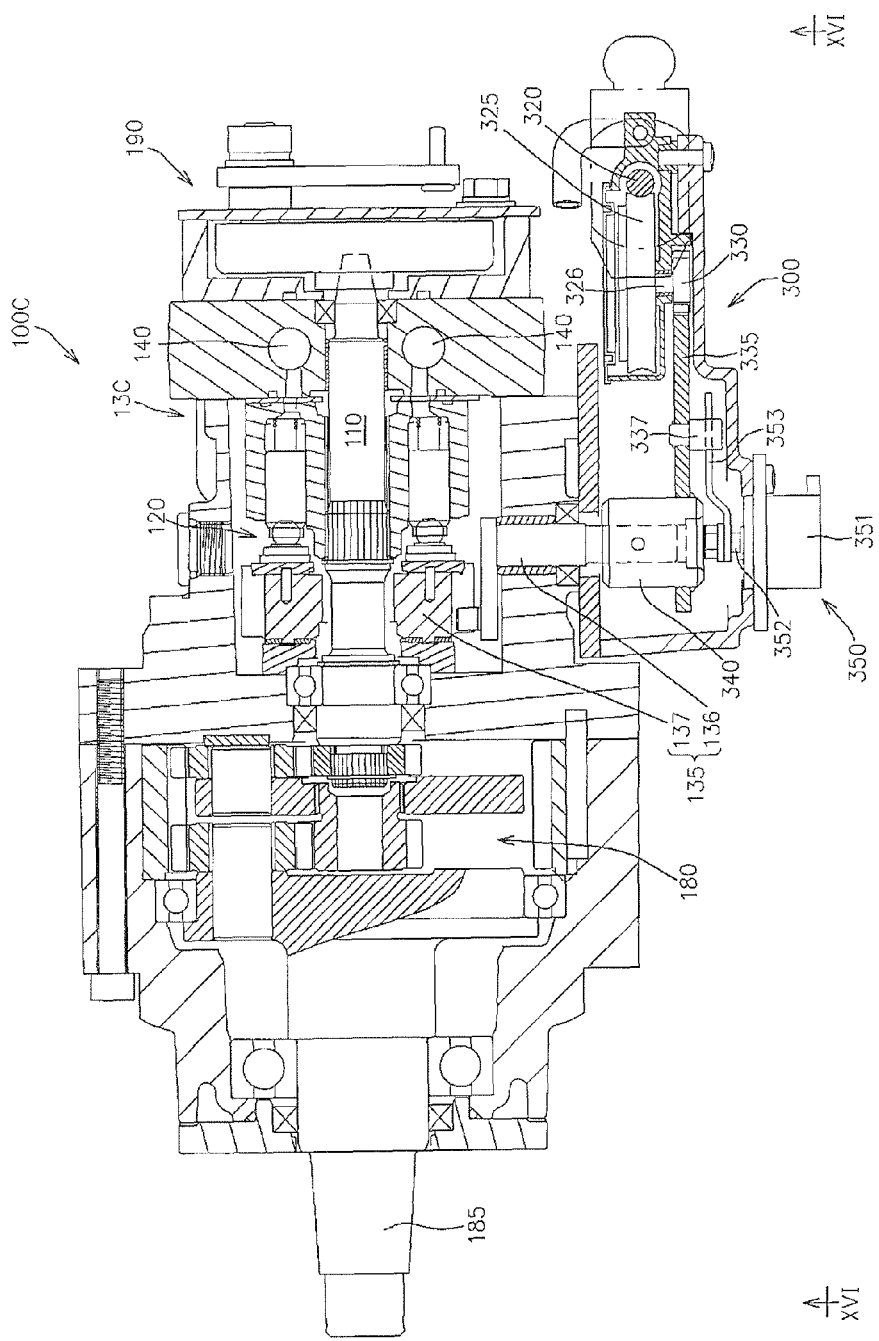
FIG. 15 is a cross-sectional view of a hydraulic motor unit according to a third embodiment of the present invention.

FIG. 15 is a cross-sectional view of a hydraulic motor unit 100C according to the present embodiment.

FIG. 16 is an end view viewed from line XVI-XVI in FIG. 15.

In the drawings, the members same as those in the first and second embodiments are denoted by the same reference numerals to omit detailed description thereof.

The hydraulic motor units 100A, 100B according to the first and second embodiments form axle-driving devices.

On the other hand, the hydraulic motor unit 100C according to the present embodiment could be mounted independently, as shown in FIGS. 15 and 16.

More specifically, the hydraulic motor unit 100C includes the hydraulic motor 120, the motor shaft 110 supporting the hydraulic motor 120 in a relatively non-rotatable manner with respect thereto, a motor housing 130C that accommodates the hydraulic motor 120 and supports the motor shaft 110 in a rotatable manner around an axis line thereof, the volume adjusting mechanism 135 that changes the volume of the hydraulic motor 120, and the electric motor 300.

The hydraulic motor unit 100C according to the present embodiment further includes a speed-reduction gear unit 180 that reduces speed of rotational power from the motor shaft 110, an output member 185 that outputs rotational power whose speed has been reduced by the speed-reduction gear unit 180, and a brake unit 190 that selectively applies brake power to a power transmission path extending from the motor shaft 110 to the output member 185 at a portion that is positioned on an upstream side of the speed-reduction gear unit 180 in a power transmitting direction.

The invention claimed is:

1. A hydraulic motor unit comprising:
a hydraulic motor;
a motor shaft that supports the hydraulic motor in a relatively non-rotatable manner with respect thereto;
a motor housing that accommodates the hydraulic motor and supports the motor shaft in a rotatable manner around an axis line thereof;
a volume adjusting mechanism that changes a volume of the hydraulic motor, wherein the volume adjusting mechanism includes a control shaft that is supported directly or indirectly by the motor housing in a rotatable manner around an axis line thereof in a state where a first end thereof is extended outward from the motor housing, and changes the volume of the hydraulic motor in accordance with rotation of the control shaft around the axis line;
an electric motor including an electric motor main body that is electrically controlled;
an electric motor case that accommodates the electric motor main body;
an electric motor main body output shaft that is rotated around an axis line thereof by the electric motor main body, the electric motor case being detachably mounted to the motor housing;
an operation shaft that is connected to the first end of the control shaft in a relatively non-rotatable manner with respect thereto;
a sector gear that has a proximal end connected to the operation shaft and a distal end provided with a gear and extends in a direction perpendicular to the control shaft; and
an electric motor cover to which the electric motor case is connected and which is detachably connected to the motor housing,
wherein mounting of the electric motor to the motor housing causes the electric motor main body output shaft to be operatively connected to the first end of the control shaft so that the control shaft is rotated around the axis line in accordance with rotation of the electric motor main body output shaft, wherein the electric motor includes an electric motor output gear operatively connected to the electric motor main body output shaft, and wherein the electric motor output gear is directly or indirectly supported by the electric motor case so that the electric motor output gear is engaged with the sector gear upon connection of the electric motor cover to the motor housing.

2. A hydraulic motor unit according to claim 1, further comprising first and second adjusting screws that have distal ends brought into contact with the sector gear to define first and second ends of a swing range of the sector gear around the operation shaft, the first and second ends being positioned on one and the other side around the operation shaft, wherein fixed positions of the first and second adjusting screws can be changed along respective axis lines.

3. A hydraulic motor unit according to claim 1, wherein the sector gear is formed with, a pass-through hole penetrating along the axis line of the operation shaft, and wherein the motor housing or a fixed member connected to the motor housing is formed with a fixing hole at a position that faces the pass-through hole at the time when the sector gear is positioned at a predetermined position around the operation shaft.

4. A hydraulic motor unit according to claim 1, further comprising a sensor unit mounted to the electric motor cover, wherein the sensor unit includes a sensor housing mounted to the electric motor cover, a sensor shaft supported by the sensor housing in a rotatable manner around its axis line so as to be coaxial with the operation shaft in a state that the electric motor cover is connected to the motor housing, a sensor arm extending in a direction orthogonal to the operation shaft in a state of having a proximal end, portion connected to the sensor shaft, a biasing member biasing toward one side around the sensor shaft a detected body that is formed by the sensor shaft and the sensor arm, and a sensor main body detecting rotational amount of the detected body around the axis line of the sensor shaft, and wherein the sector gear is provided with an engagement pin that extends parallel to the operation shaft and with which the sensor arm biased toward one side around the sensor shaft by the biasing member is engaged in a state where the electric motor cover with the sensor unit is connected to the first motor housing.

5. A hydraulic motor unit according to claim 1, wherein the electric motor is provided with a worm shaft that is positioned coaxially with the electric motor main body output shaft and is operatively connected to the electric motor output gear in such a manner as that the electric motor output gear is rotated in accordance with rotation of the worm shaft around its axis line, and a clutch mechanism that is provided between the electric motor main body output shaft and the worm shaft, wherein the clutch mechanism includes a driving-side arm that is provided at an distal end of the electric motor main body output shaft so as to extend radially outward, a collar member that surrounds the driving-side arm, a driven-side arm that is provided at the end of the worm shaft closer to the electric motor main body output shaft so as to extend radially outward, and a contact member that is disposed between the driven-side arm and the collar member with respect to a radial direction with the axis line of the electric motor main body output shaft and the worm shaft being as a reference, wherein the driving-side arm has side surfaces facing in a circumferential direction with the axis line of the electric motor main body output shaft being as a reference, the side surfaces being configured so as to press, in the circumferential direction, side surfaces of both the driven-side arm and the contact member that face in the circumferential direction, and wherein the driven-side arm has an outer end surface that faces radially outward, the outer end surface being substantially perpendicular to a virtual line connecting a circumferential center of the outer end surface and the axis line of the electric motor main body output shaft and the worm shaft when seen along the axis line.

* * * * *